US009718499B2

United States Patent
Tanaka et al.

(10) Patent No.: US 9,718,499 B2
(45) Date of Patent: Aug. 1, 2017

(54) PRESS COMPONENT AND METHOD AND DEVICE FOR MANUFACTURING SAME

(71) Applicant: NIPPON STEEL & SUMITOMO METAL CORPORATION, Chiyoda-ku, Tokyo (JP)

(72) Inventors: Yasuharu Tanaka, Tokyo (JP); Toshimitsu Aso, Tokyo (JP); Takashi Miyagi, Tokyo (JP); Misao Ogawa, Tokyo (JP); Kazuyuki Kawano, Tokyo (JP); Kazunori Oooka, Tokyo (JP); Shinobu Yamamoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 99 days.

(21) Appl. No.: 14/758,671

(22) PCT Filed: Dec. 20, 2013

(86) PCT No.: PCT/JP2013/084299
§ 371 (c)(1),
(2) Date: Jun. 30, 2015

(87) PCT Pub. No.: WO2014/106932
PCT Pub. Date: Jul. 10, 2014

(65) Prior Publication Data
US 2015/0336619 A1 Nov. 26, 2015

(30) Foreign Application Priority Data

Jan. 7, 2013 (JP) .............................. 2013-000547

(51) Int. Cl.
*B62D 25/04* (2006.01)
*B62D 65/00* (2006.01)
(Continued)

(52) U.S. Cl.
CPC ............. *B62D 25/04* (2013.01); *B21D 22/20* (2013.01); *B21D 22/22* (2013.01); *B21D 22/26* (2013.01);
(Continued)

(58) Field of Classification Search
CPC ........ B62D 25/04; B62D 65/00; B21D 22/20; B21D 22/22; B21D 22/26; B21D 53/88; B21J 5/02; B21K 7/12
(Continued)

(56) References Cited

U.S. PATENT DOCUMENTS 7,596,980 B2 * 10/2009 Kimura ................. B21D 19/08
72/348
2004/0244458 A1 * 12/2004 Yamano .................. B21D 5/01
72/350
(Continued)

FOREIGN PATENT DOCUMENTS

JP 60-103518 7/1985
JP 2006-015404 1/2006
(Continued)

OTHER PUBLICATIONS

Korean Office Action for Korean Application No. 10-2015-7020746, dated Jun. 28, 2016, with a partial English translation.
Third Party Observation of PCT/JP2013/084299 dated May 6, 2015.

*Primary Examiner* — Joseph D Pape
(74) *Attorney, Agent, or Firm* — Birch, Stewart, Kolasch & Birch, LLP

(57) ABSTRACT

The top plate section of the metal stock is pressed and clamped against a punch by a pad, a portion that will be at the outside of the L shaped curve is pressed and camped against a die by a blank holder, a bender is moved, and a vertical wall portion at the inside of the L shaped curved of the metal stock sheet and the flange portion joined to the vertical wall at the inside of the L shaped curve are molded.

(Continued)

The metal stock sheet is moved in the direction toward the blank holder while the metal stock sheet being pressed and clamped, and a vertical wall portion at the outside of the L shaped curve of the L shaped hat shaped cross-section and the flange portion joined to the vertical wall at the outside of the L shaped curve are molded.

10 Claims, 26 Drawing Sheets

(51) Int. Cl.
*B21J 5/02* (2006.01)
*B21K 7/12* (2006.01)
*B21D 22/20* (2006.01)
*B21D 22/22* (2006.01)
*B21D 22/26* (2006.01)
*B21D 53/88* (2006.01)
*B21D 24/04* (2006.01)
*B21D 5/04* (2006.01)

(52) U.S. Cl.
CPC ............... *B21D 53/88* (2013.01); *B21J 5/02* (2013.01); *B21K 7/12* (2013.01); *B62D 65/00* (2013.01); *B21D 5/045* (2013.01); *B21D 24/04* (2013.01); *Y10T 29/49623* (2015.01); *Y10T 428/1241* (2015.01)

(58) Field of Classification Search
USPC ...................................................... 296/193.06
See application file for complete search history.

(56) References Cited

U.S. PATENT DOCUMENTS

2005/0262917 A1    12/2005    Osumi et al.
2012/0297853 A1    11/2012    Tanaka et al.

FOREIGN PATENT DOCUMENTS

| JP | 2010-115674 | 5/2010 |
| KR | 10-2012-0140236 A | 12/2012 |
| WO | WO 2011/145679 | 11/2011 |
| WO | WO2012/070623 | 5/2012 |

* cited by examiner

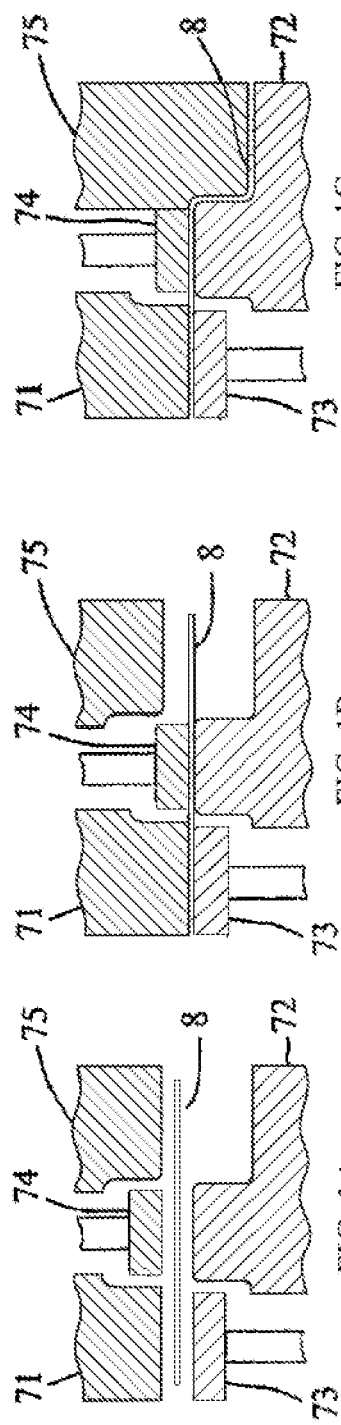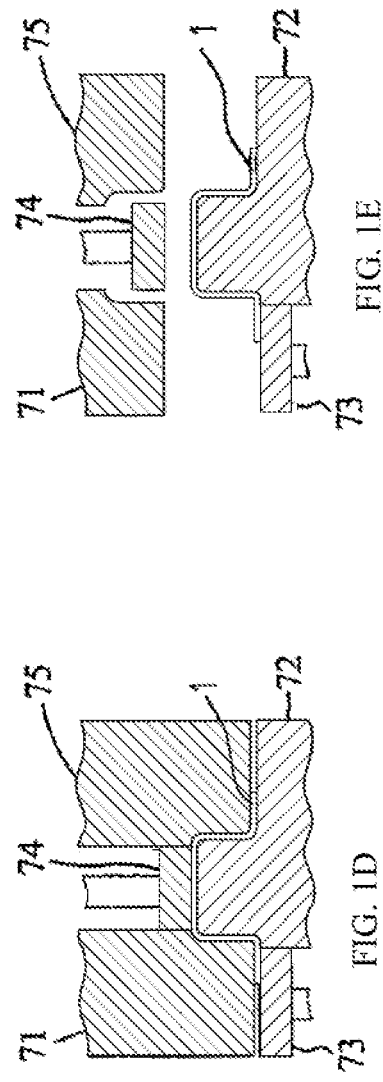

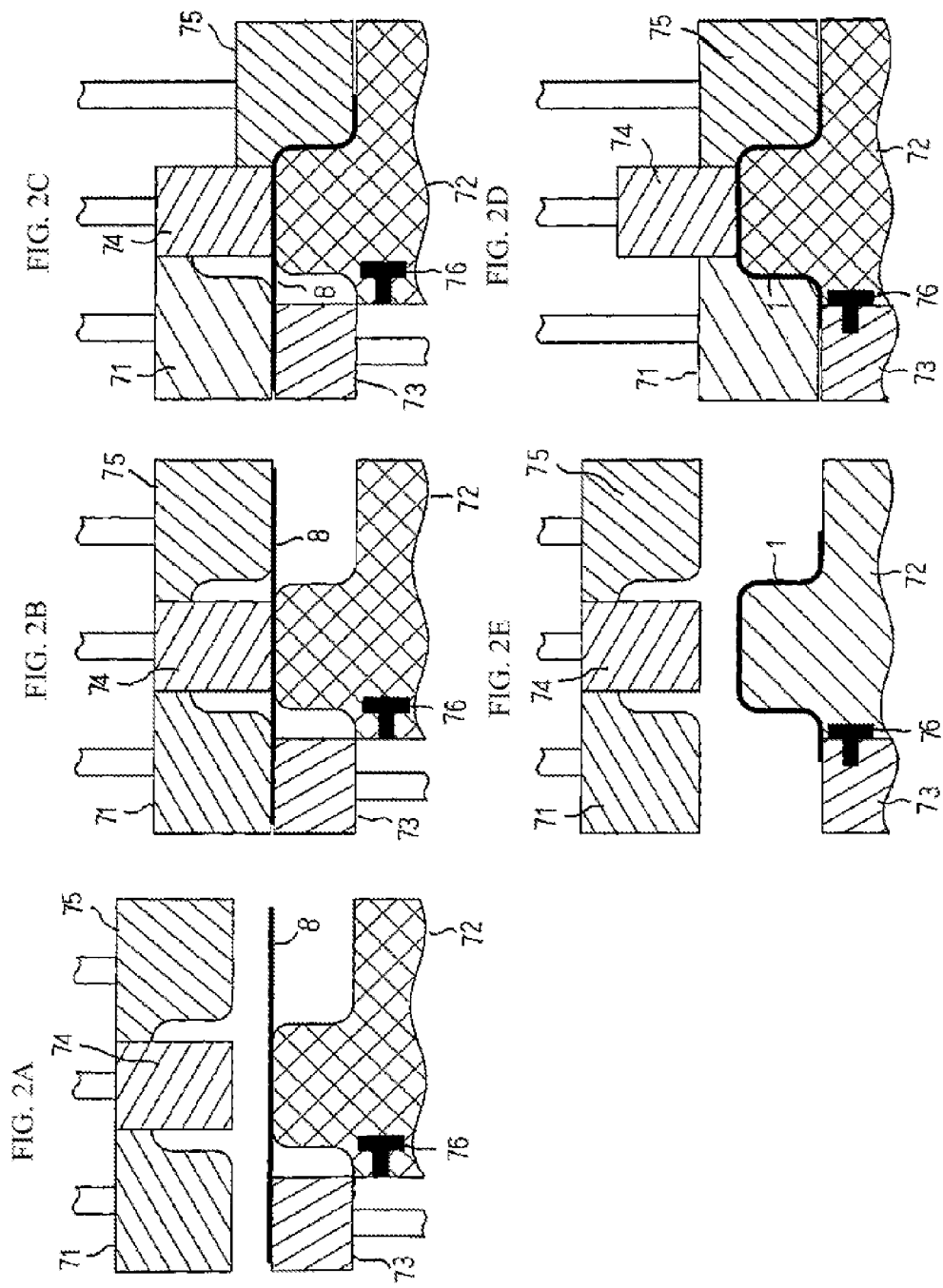

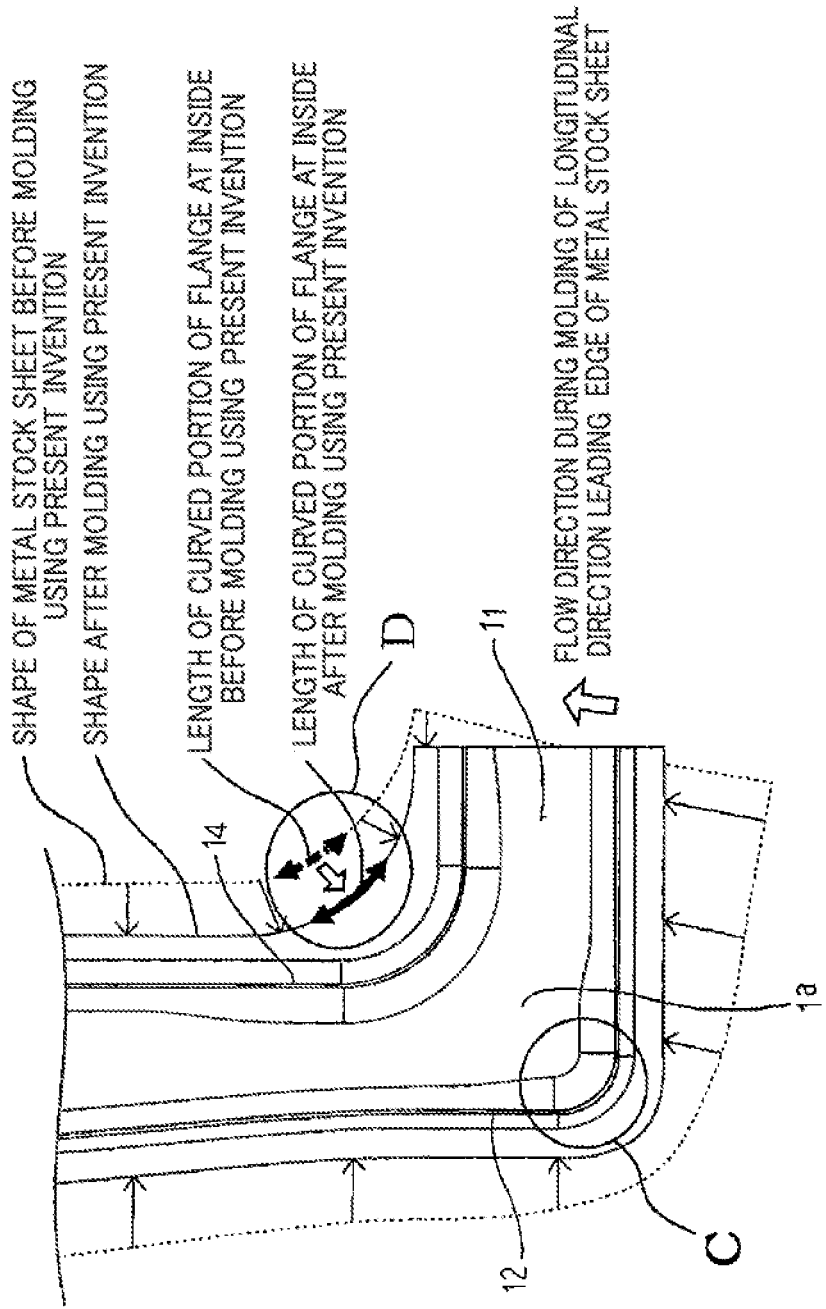

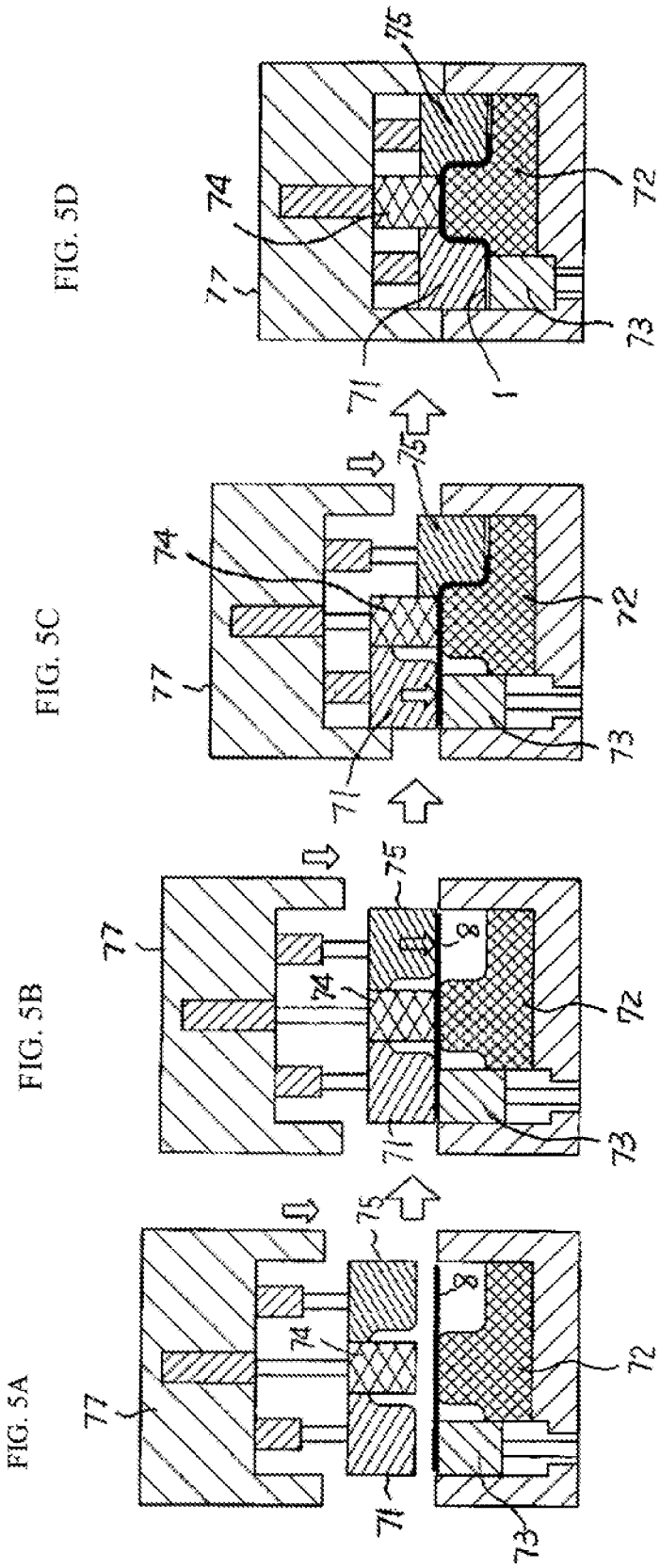

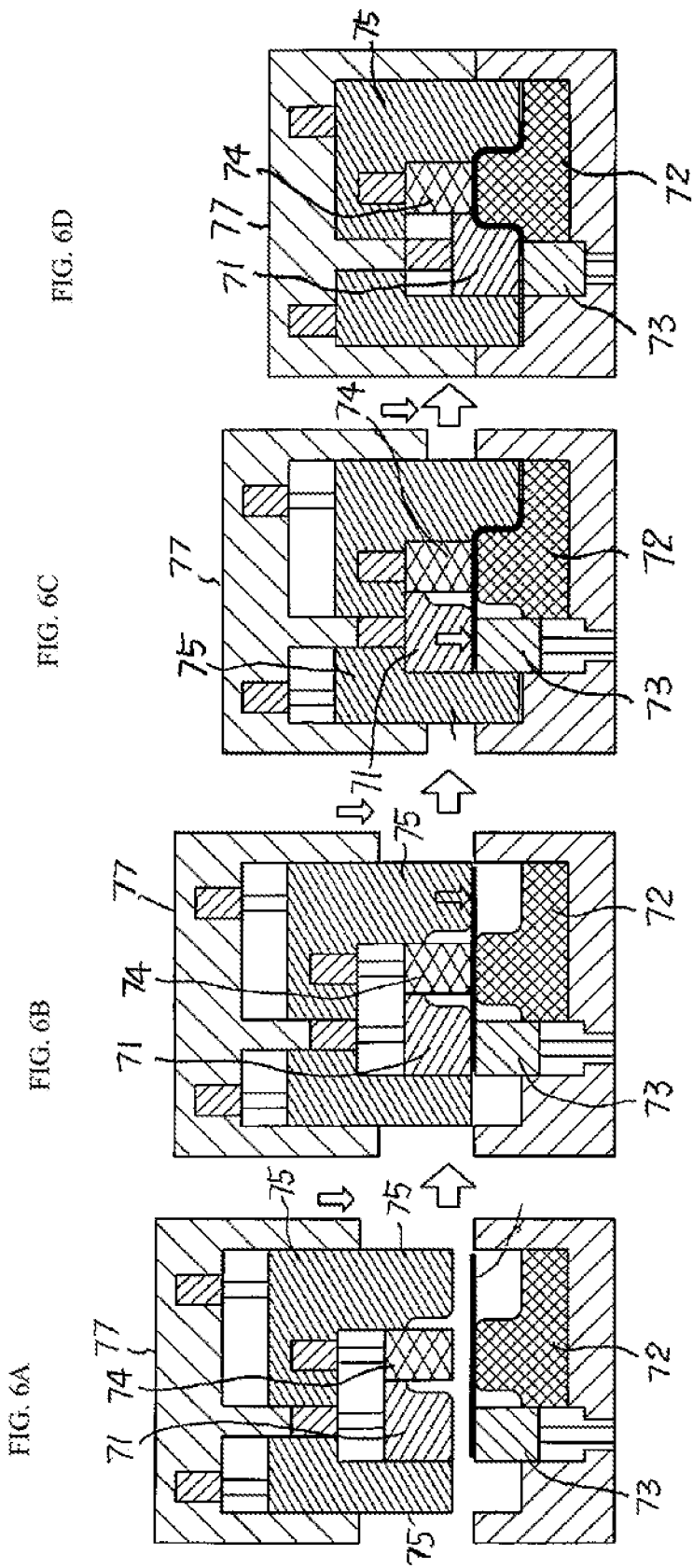

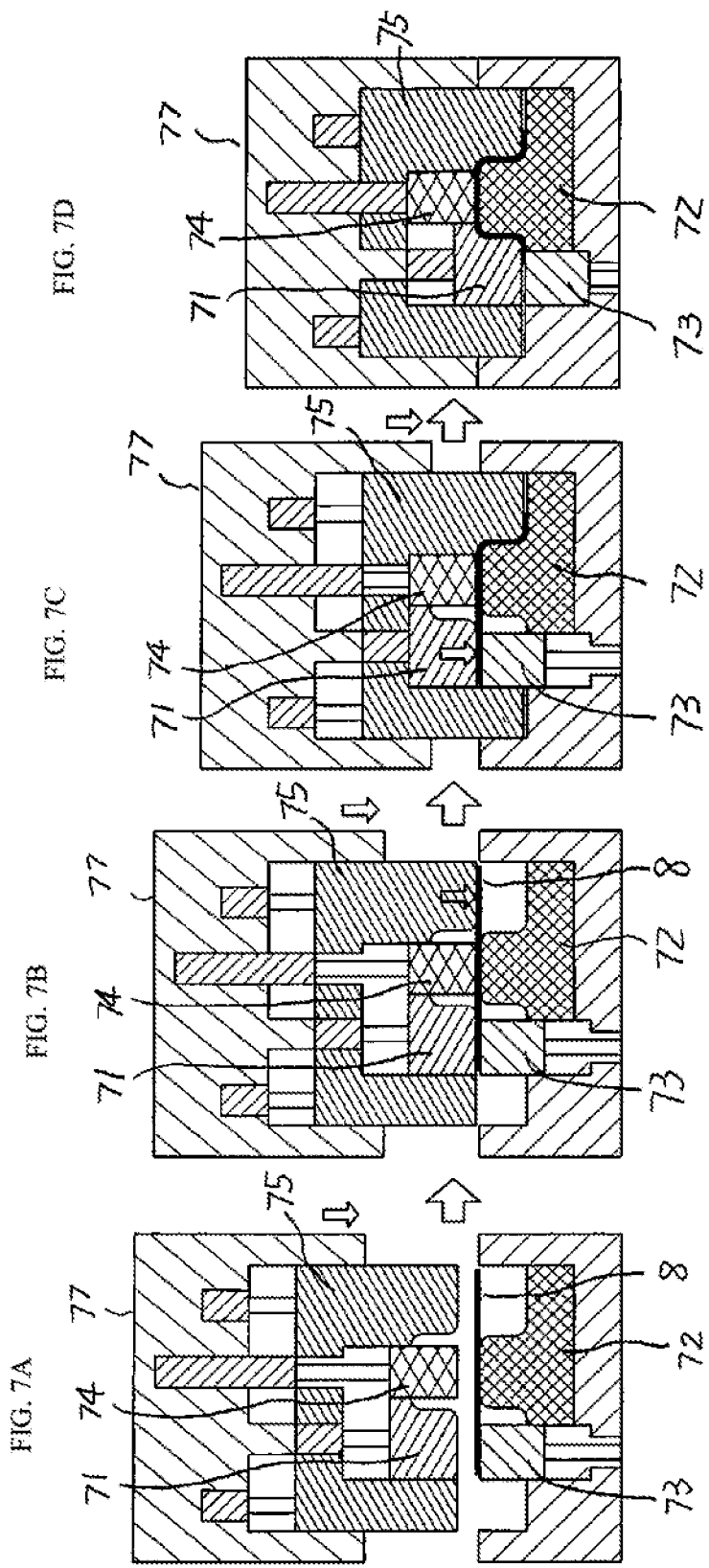

PLAN VIEW

PRESS COMPONENT AND METHOD AND DEVICE FOR MANUFACTURING SAME

CROSS-REFERENCE TO RELATED APPLICATIONS

This application is a national stage application of International Application No. PCT/JP2013/084299, filed Dec. 20, 2013, which is incorporated by reference in its entirety, and which claims priority to Japanese Patent Application No. 2013-000547, filed on Jan. 7, 2013.

TECHNICAL FIELD

The present invention relates to a press component that has a hat shaped cross-section and that is curved in an L shape along the longitudinal direction in plan view, and a manufacturing method and manufacturing device for the same.

BACKGROUND ART

Frame structures of vehicle bodies of automobiles are configured from plural frame members obtained by press molding sheet metal (sheet steel is taken as an example of metal stock sheet in the explanation that follows). Such frame components are very important components for securing crash safety in automobiles. Known examples of frame members include side sills, cross members, and front pillars.

Such frame members have hat shaped cross-sections configured from a top plate section, two vertical walls joined to the both sides of the top plate section, and two flange portions joined to the two respective vertical walls. Most of such frame members have a hat shaped cross-section over a portion or the entirety thereof. High strength is desired in such frame members in order to improve crash safety performance and to achieve weight reduction in vehicles.

FIG. 19 is a perspective view of an example of a frame member 0 that has a hat shaped cross-section and that has a straight shape along the longitudinal direction in plan view and side view. FIG. 20 is a explanatory diagram of a front pillar 0-1 that is an example of a frame member having a hat shaped cross-section. FIG. 20A is a perspective view and FIG. 20B is a plan view. FIG. 21 is a perspective view illustrating a component 1 having a hat shaped cross-section and having a shape curved in an L shape along the longitudinal direction in plan view. In the present specification, "plan view" refers to viewing the front pillar 0-1 from a direction orthogonal to the top plate section that is the widest planar portion on the member (the direction of the white arrow in FIG. 20A, and the direction orthogonal to the page in FIG. 20B).

The frame member 0 is a side sill or the like out of frame members having a hat shaped cross-section, and has a shape that is substantially straight in the longitudinal direction as illustrated in the example of FIG. 19. In contrast thereto, the front pillar 0-1 has a shape like that illustrated in FIG. 20A and FIG. 20B. Namely, the front pillar 0-1 has a hat shaped cross-section and includes a shape curved in an L shape along the longitudinal direction in plan view as illustrated in FIG. 21, at the side of a lower portion 0-2 of the front pillar 0-1.

Out of such components, the frame member 0 is manufactured mainly by bending due to having a substantially straight shape along the longitudinal direction. Due to the peripheral length of the cross-section of the frame member 0 not changing much along the length direction, cracks and creases are not readily generated during press processing even when formed from high strength sheet steel having low extensibility, and molding is simple.

For example, Patent Document 1 describes a method that forms a press component having a hat shaped cross-section by bending. The method described in Patent Document 1 manufactures press components that have a hat shaped cross-section and that have a substantially straight shape along the longitudinal direction.

FIG. 22 is a perspective view illustrating a press component 1 manufactured by bending that has a hat shaped cross-section and that has a shape curved in an L shape along the longitudinal direction.

When the component 1 illustrated in FIG. 21 that has a hat shaped cross-section and that is curved in an L shape along the longitudinal direction by bending using the method described by Patent Document 1, creases are generated in the flange portion (portion A) at the outside of a curved portion 1a as illustrated in FIG. 22. Therefore, the component 1 is generally molded by drawing in press processing. In drawing, steel stock sheet is molded using a die, a punch, and a blank holder in order to control the amount of inflow of metal stock sheet and to suppress generation of creases.

FIG. 23 is an explanatory diagram illustrating a component 2 to be molded that is curved in an L shape along the longitudinal direction. FIG. 23A is a perspective view, and FIG. 23B is a plan view. FIG. 24 is a plan view illustrating the shape of a steel stock sheet 3 when drawing, and a crease inhibiting region B in a steel stock sheet 3. FIG. 25A to FIG. 25D are cross-sections illustrating a mold structure and a molding procedure for drawing. FIG. 26 is a perspective view of a drawn panel 5 that has been molded by drawing.

For example, molding employs a die 41, a punch 42, and a blank holder 43 as illustrated in FIG. 25A to FIG. 25D, in order to mold a component 2 that is curved in an L shape along the longitudinal direction in side view, illustrated in FIG. 23, by drawing.

First, as illustrated in FIG. 25A, the steel stock sheet 3 illustrated in FIG. 24 is positioned between the punch 42 and the blank holder 43, and the die 41. Next, for example, as illustrated in FIG. 25B, the crease inhibiting region B of the periphery of the steel stock sheet 3 (the hatching shaded portion of FIG. 24) is held strongly by the blank holder 43 and the die 41. Next, as illustrated in FIG. 25C, the die 41 is moved relatively in the direction of the punch 42. Then finally, as illustrated in FIG. 25D, the drawn panel 5 illustrated in FIG. 26 is molded by processing the steel stock sheet 3 by pressing the steel stock sheet 3 against the punch 42 using the die 41.

When doing so, the crease inhibiting region B at the periphery of the steel stock sheet 3 is held strongly by the blank holder 43 and the die 41. Therefore, in the steel stock sheet 3 obtained by the molded procedure, the steel stock sheet 3 is stretched in a region at the inside of the crease inhibiting region in a state under tensile load. It is therefore possible to mold while suppressing generation of creases. The unwanted portions at the periphery of the molded drawn panel 5 are then cut away so as to manufacture the component 2 illustrated in FIG. 23A and FIG. 23B.

RELATED DOCUMENTS

Related Patent Documents

Patent Document 1: Japanese Patent Application Laid-Open (JP-A) No. 2006-015404

SUMMARY OF INVENTION

Technical Problem

Conventionally, shapes like that of the press component 1 are manufactured by press molding using drawing as described above, by molding a steel stock sheet into the drawn panel 5 illustrated in FIG. 26 and eliminating unwanted portions at the periphery of the drawn panel 5 by trimming In this drawing method, a complicated shape can be molded, like that of the component 2 that is curved in an L shape along the longitudinal direction in plan view. However, as illustrated in FIG. 24, a large region for inhibiting creases is required around the periphery of the steel stock sheet 3. Therefore after the steel stock sheet 3 has been molded into the drawn panel, the unwanted portions eliminated by trimming are large portions, decreasing material yield and increasing manufacturing cost.

Moreover, vertical walls 22, 24 illustrated in FIG. 23A are molded simultaneously in the procedure that molds the drawn panel 5. Thus in the molding procedure, material inflows from both sides of the top plate section 21 to mold the vertical walls 22, 24 as illustrated in FIG. 25B to FIG. 25D, without the steel stock sheet 3 moving significantly at the portion that forms a top plate section 21. In particular, the flange portion (a portion D in FIG. 26) at the inside of a curved portion 5a that is curved in an L shape in plan view of the drawn panel 5 assumes a molded state referred to as stretch flanging, and cracks develop in high strength sheet steel having low extensibility. Is particular, extensibility is low in high strength steel having a tensile strength of 590 MPa or above, making is difficult to process without generating cracks in the portion D.

The corner where the vertical wall 22 at the outside of a curved portion 2a meets the top plate section 21 (a portion C in FIG. 26) is a shape jutting out by a large amount, and predictably, this causes cracks to develop in high strength sheet steel having low extensibility due to the steel stock sheet 3 being greatly stretched.

More detailed explanation follows. FIG. 27 is a plan view that explains flow of material during drawing.

The vertical walls 12, 14 at the outside periphery and the inside periphery of the curved portion 1a are formed at the same time when molding the drawn panel 5, and molding is therefore performed by causing material to inflow from both sides of a top plate section 11 as illustrated in FIG. 27, without the steel stock sheet moving significantly at the portion that forms the top plate section 11.

In particular, the steel stock sheet 3 at the portion that forms the inside periphery of the curved portion 1a (the portion D in FIG. 26 and FIG. 27) is displaced toward the outside from the inside of the curvature of the curved portion 1a, and is greatly stretched in radial directions of the curved portion 1a, thereby assuming the molded state referred to as stretch flanging. Cracks thereby develop in high strength sheet steel having low extensibility.

Since the portion C in FIG. 26 has a shape that juts out by a large amount at the corner of the outside periphery of the curved portion 1a, the steel stock sheet is greatly stretched, and cracks are generated in high strength sheet steel having low extensibility similarly to in the portion D.

Therefore, conventionally, components that are curved in an L shape along the longitudinal direction are difficult to form using the steel stock sheet 3 formed from high strength sheet steel having low extensibility, and in particular when formed from high strength sheet steel having a tensile strength of 590 MPa or greater, and so sheet steel that has comparatively low tensile strength and excellent extensibility is employed as the steel stock sheet 3. Increasing sheet thickness is therefore necessary to secure a specific strength, conflicting with demands to reduce vehicle weight.

An object of the present invention is to provide technology enabling manufacture of a press component that has an L shaped hat shaped cross-section due to having a hat shaped cross-section and a curved portion that is curved along the longitudinal direction in plan view, and that has excellent yield without causing creases or cracks to be generated, by performing press molding on metal stock sheet formed from metal stock sheet having a tensile strength of from 200 MPa to 1600 MPa, and in particular, metal stock sheet formed from high strength sheet steel having a tensile strength of 590 MPa or greater.

Solution to Problem

Aspects of the present invention are listed below.

(1) A manufacturing method for a press component in which press working is performed on a metal stock sheet to mold a press component having an L shaped hat shaped cross-section formed from a hat shaped cross-section configured by a top plate section, two vertical walls joined to both sides of the top plate section, and two flanges joined to the two respective vertical walls, and from a curved portion that curves along the longitudinal direction in plan view, or a press component having such an L shaped hat shaped cross-section over a portion thereof, the method including molding the press component by:

placing the metal stock sheet between a punch and a blank holder, and a pad, a die and a bender;

pressing and clamping a portion of the metal stock sheet for forming the top plate section against the punch using the pad, and pressing and clamping a portion of the metal stock sheet that will be further to the outside of the curve portion than the portion of the metal stock sheet for forming the top plate section against the die using the blank holder; and after molding the vertical wall at the inside periphery of the curved portion and the flange portion joined to that vertical wall through working the metal stock sheet by relatively moving the bender in the direction toward where the punch is positioned, molding the vertical wall at the outside periphery of the curved portion and the flange portion joined to that vertical wall, by relatively moving the die and the blank holder in the direction toward where the blank holder is positioned relative to the metal stock sheet and working the metal stock sheet while maintaining the state in which the metal stock sheet is pressed and clamped against the die by the blank holder.

Namely, in the present invention, after molding the vertical wall and the flange portion at the inside periphery of the curved portion by moving the bender in the direction toward where the punch is positioned while the portion of the metal stock sheet for forming the top plate section is press and clamped against the punch by the pad, and while the portion of the metal stock sheet that will be further to the outside of the L shaped curve portion than the portion of the metal stock sheet for forming the top plate section is pressed and clamped against the die by the blank holder, the vertical wall and the flange portion at the outside periphery of the curved portion are molded by moving the die and the blank holder relative to the metal stock sheet in the direction toward where the blank holder is positioned while maintaining a state in which the metal stock sheet is pressed and clamped against the die by the blank holder.

When doing so, the metal stock sheet is only stretched from the inside periphery of the curved portion during molding, and the portion of the metal stock sheet for forming the top plate section inflows to the inside periphery of the curved portion, due to not forming the vertical wall and the flange portion at the outside periphery of the curved portion in the process that molds the vertical wall and the flange portion at the inside periphery of the curved portion. Therefore, in contrast to cases of drawing, the portion of the metal stock sheet for forming the inside periphery of the curved portion does not move significantly from the inside periphery toward the outside periphery of the curvature of the curved portion in the molding procedure. Moreover, the metal stock sheet bends as a whole due to the longitudinal direction leading ends of the metal stock sheet inflowing to the inside periphery of the curved portion, and the flange portion at the inside periphery of the curved portion tends to become compressed. The amount of stretch of the flange portion at the inside periphery of the curved portion during mold is therefore lessened greatly compared to in drawing.

In the molding procedure for the vertical wall portion and the flange portion at the inside periphery of the curved portion, a state is achieved in which there is residual compression stress due to inflow of the top plate section and the flange portion at the outside periphery in the direction toward the inside of the curved portion. Material is accordingly able to be stretched greatly in the procedure to mold the vertical wall and the flange portion at the outside periphery of the curved portion, and the corner where the vertical wall and top plate section meet at the outside periphery of the curved portion is also molded into a shape by pulling out from a state in which there is residual compression stress. The extensibility required of the material is therefore small than cases in which drawing is performed by molding from a state without compression stress.

Therefore, stretching of the metal stock sheet can be reduced at the flange portion at the inside periphery of the curved portion, and at corner portion where the vertical wall and top plate section meet at the outside periphery of the curved portion, where cracks develop due to the metal stock sheet being stretched greatly in drawing of related technology when high strength sheet metal (for example, high tension sheet steel having a tensile strength of 590 MPa or more) is employed. This thereby enables molding without cracks even when high strength metal stock sheet having low extensibility is employed.

Moreover, bending is performed on the vertical wall and the flange portion at the inside periphery of the curved portion using the bender, and due to not requiring the crease inhibiting regions that were necessary during drawing for the portion at the inside periphery of the curved portion and for a longitudinal direction leading end portion, the metal stock sheet can be made smaller by a corresponding amount, enabling the portions eliminated by trimming after molding to be reduced, and enabling molding at high material yield to be achieved.

(2) The manufacturing method for a press component of (1), wherein: the punch has a shape including sheet thickness back face side shapes of each of the top plate section, the vertical wall, and the flange portion joined to the vertical wall positioned at the inside periphery of the L shaped curved portion; the blank holder has a shape including the sheet thickness back face side shape of the flange portion joined to the vertical wall positioned at the outside periphery of the curved portion; the pad is shaped so as to face toward the blank holder and has a shape including the sheet thickness front face side shape of the top plate section; the die has a shape including the sheet thickness front face side shapes of each of the vertical wall positioned at the outside periphery of the curved portion, and the flange portion joined to that vertical wall; and the bender has a shape including the sheet thickness front face side shape of each of the vertical wall positioned at the inside periphery of the curved portion, and the flange portion joined to that vertical wall.

(3) The manufacturing method for a press component of (1) or (2), wherein the metal stock sheet is a pre-worked metal sheet.

(4) The manufacturing method for a press component of any one of (1) to (3), wherein, after molding the press component, the press component is taken out from the mold by fixing the blank holder so as not to move relative to the punch, and moving the pad, the die, and the bender relatively away from the blank holder and the punch, such that blank holder does not press the molded press component against the die under pressure.

(5) The manufacturing method for a press component of any one of (1) to (4), wherein the metal stock sheet is high tensile sheet steel having a sheet thickness of from 0.8 mm to 3.2 mm, and a tensile strength of from 590 MPa to 1800 MPa.

(6) The manufacturing method for a press component of any one of (1) to (5), wherein: the width of the top plate section in plan view is from 30 mm to 400 mm; the height of the vertical walls in side view is 300 mm or less; and the curvature at the inside periphery of the curved portion in plan view is 5 mm or more.

(7) A manufacturing device for a press component, the manufacturing device including a punch and a blank holder, and a pad, a die and a bender that are disposed facing the punch and the blank holder, wherein the manufacturing device performs press working on a metal stock sheet to mold a press component having an L shaped hat shaped cross-section formed from a hat shaped cross-section configured by a top plate section, two vertical walls joined to both sides of the top plate section, and two flanges joined to the two respective vertical walls, and from a curved portion that curves along the longitudinal direction in plan view, or a press component having such an L shaped hat shaped cross-section over a portion thereof, the manufacturing device molding the press component by:

performing first molding that molds the vertical wall at the inside periphery of the curved portion and the flange portion joined to that vertical wall by the pad pressing and clamping a portion of the metal stock sheet for forming the top plate section against the punch, the blank holder pressing and clamping a portion of the metal stock sheet that will be further to the outside of the curve portion than the portion of the metal stock sheet for forming the top plate section against the die, and working the metal stock sheet by relatively moving the bender in the direction toward where the punch is positioned; and performing second molding to mold the vertical wall at the outside periphery of the curved portion and the flange portion joined to that vertical wall by, after the first molding has been performed, relatively moving the die and the blank holder in the direction toward where the blank holder is positioned relative to the metal stock sheet and working the metal stock sheet while maintaining the state in which the metal stock sheet is pressed and clamped against the die by the blank holder.

(8) The manufacturing device for a press component of (7), further including a locking mechanism that fixes the blank holder such that the blank holder cannot move relative to the punch during demolding after molding has been completed.

(9) The manufacturing device for a press component of (7) or (8), further including a sub-base that supports the pad and the die so as to be capable of being raised and lowered, and that is configured integrated together with the bender; and a die base that supports the sub-base so as to be insertable and retractable.

(10) The manufacturing device for a press component of (7) or (8), further including: a sub-base base that supports the die so as to be capable of being raised and lowered, and that is configured integrated together with the bender; and a die base that supports the pad so as to be capable of being raised and lowered, and that supports the sub-base so as to be insertable and retractable.

(11) A press component having a hat shaped cross-section configured from a top plate section, two vertical walls joined to both sides of the top plate, and two flange portions joined to the two respective vertical walls, and having a shape curved in an L shape along the longitudinal direction in plan view due to including a curved portion, wherein: the press component is a press molded body configured by employing high tensile sheet steel having a sheet thickness of from 0.8 mm to 32 mm and tensile strength of from 590 MPa to 1800 MPa as metal stock sheet; the width of the top plate section in plan view is from 30 mm to 400 mm, the height of the vertical walls in side view is 300 mm or less, and the curvature of the inside periphery of the curved portion in plan view is 5 mm or more; and the proportional decrease in the sheet thickness, as calculated by ((maximum value of sheet thickness−minimum value of sheet thickness)/minimum value of sheet thickness)×100, is 15% or less.

(12) The press component of (11) wherein the press component is an A pillar inner panel that is a structural member of an automobile.

Advantageous Effects of Invention

The present invention enables manufacture of a press component that has a hat shaped cross-section and an L shaped curved portion that is curved along the longitudinal direction in plan view, and that has excellent yield without causing creases or cracks to be generated, by performing press molding on metal stock sheet formed from metal stock sheet having tensile strength of from 200 MPa to 1600 MPa, and in particular, metal stock sheet high strength material having a tensile strength of 590 MPa or greater.

BRIEF DESCRIPTION OF DRAWINGS

FIGS. 1A to 1E are cross-sections illustrating a mold configuration and molding process according to the present invention.

FIGS. 2A to 2E are cross-sections illustrating another mold configuration and molding process according to the present invention.

FIG. 4 is a plan view illustrating flow of material in the present invention.

FIGS. 5A to 5D are explanatory diagrams illustrating an example of a mold employed in the present invention.

FIG. 6A to 6D are explanatory diagrams illustrating another example of a mold employed in the present invention.

FIGS. 7A to 7D are explanatory diagrams illustrating another example of a mold employed in the present invention.

FIG. 20 is an explanatory diagram of a front pillar that is a frame member having a hat shaped cross-section.

FIG. 23 is an explanatory diagram illustrating a component to be formed that is curved in an L shape along the longitudinal direction.

DESCRIPTION OF EMBODIMENTS

A press component according to the present invention, and a manufacturing method for the same, are explained in sequence below.

1. Press Component 1

As in the example described above of the shape in FIG. 21, the press component 1 has a hat shaped cross-section and has the curved portion 1a that is curved in an L shape along the longitudinal direction in plan view.

Figure 21:
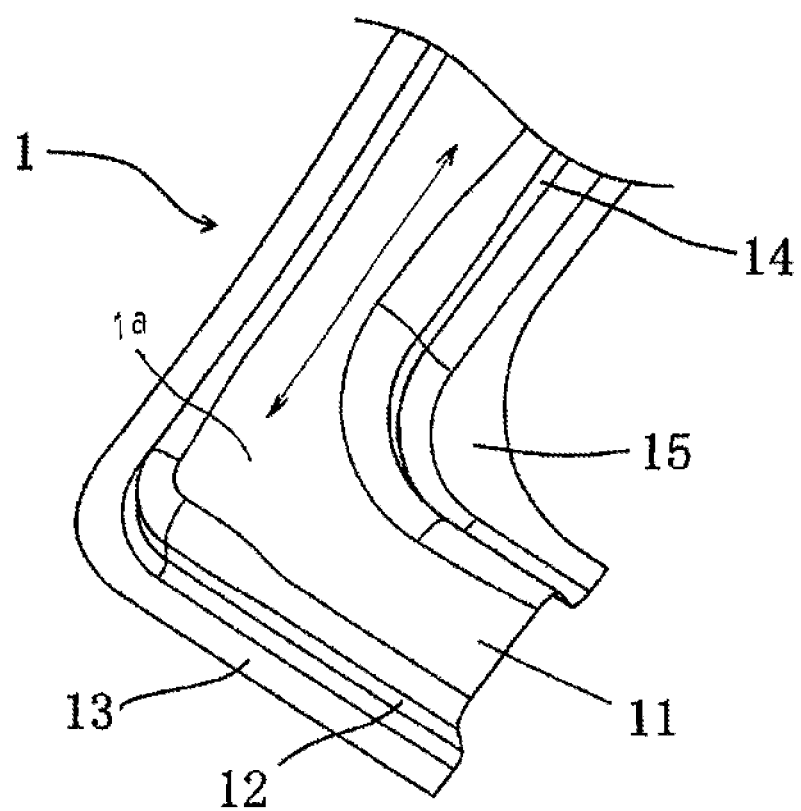
FIG. 21 is a perspective view illustrating a component that has a hat shaped cross-section and that has a shape curved in an L shape along the longitudinal direction in plan view.
Figure 22:
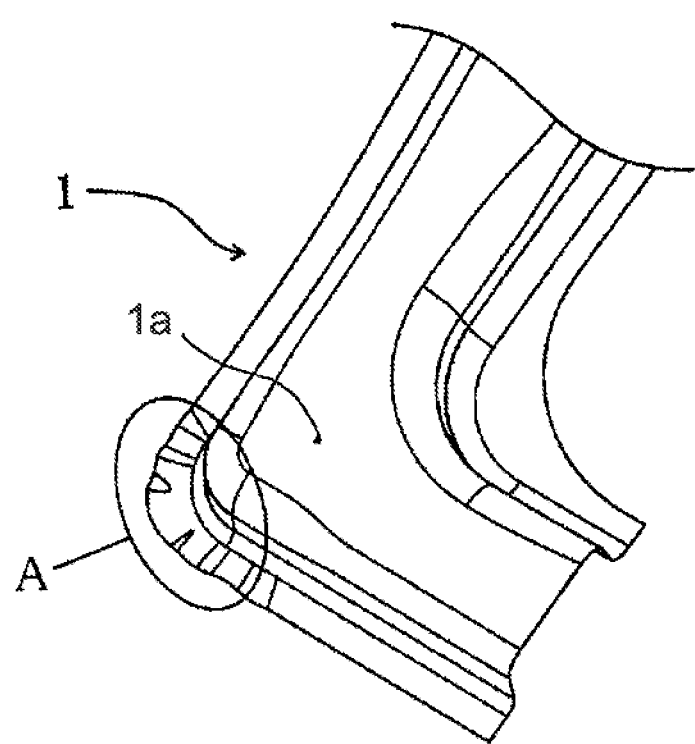
FIG. 22 is a perspective view illustrating state of a press component that has a hat shaped cross-section and that has a shape curved in an L shape along the longitudinal direction manufactured by bending.
Figure 23B:
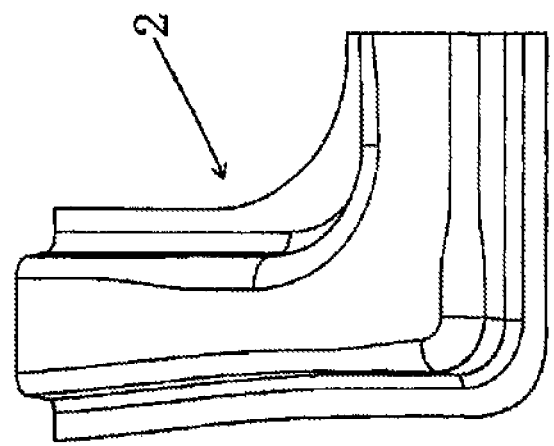
FIG. 23B is a plan view.
Figure 23A:
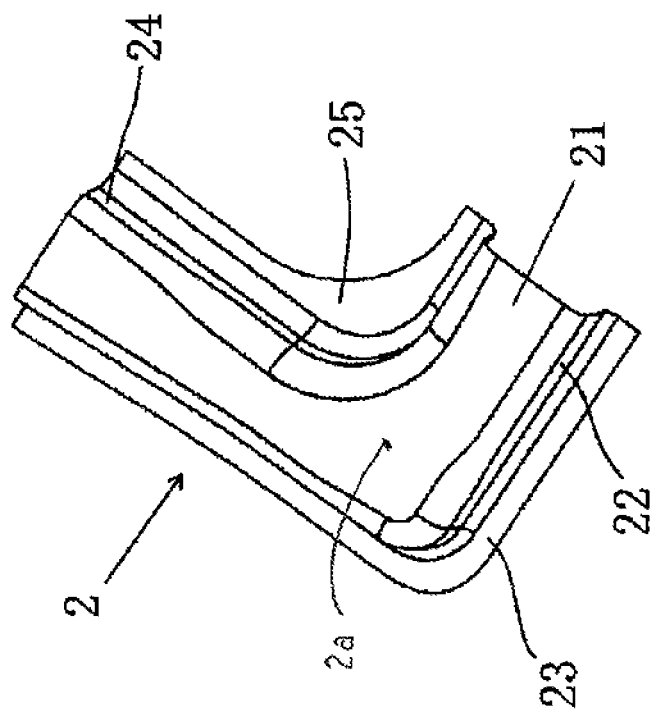
FIG. 23A is a perspective view.
Figure 24:
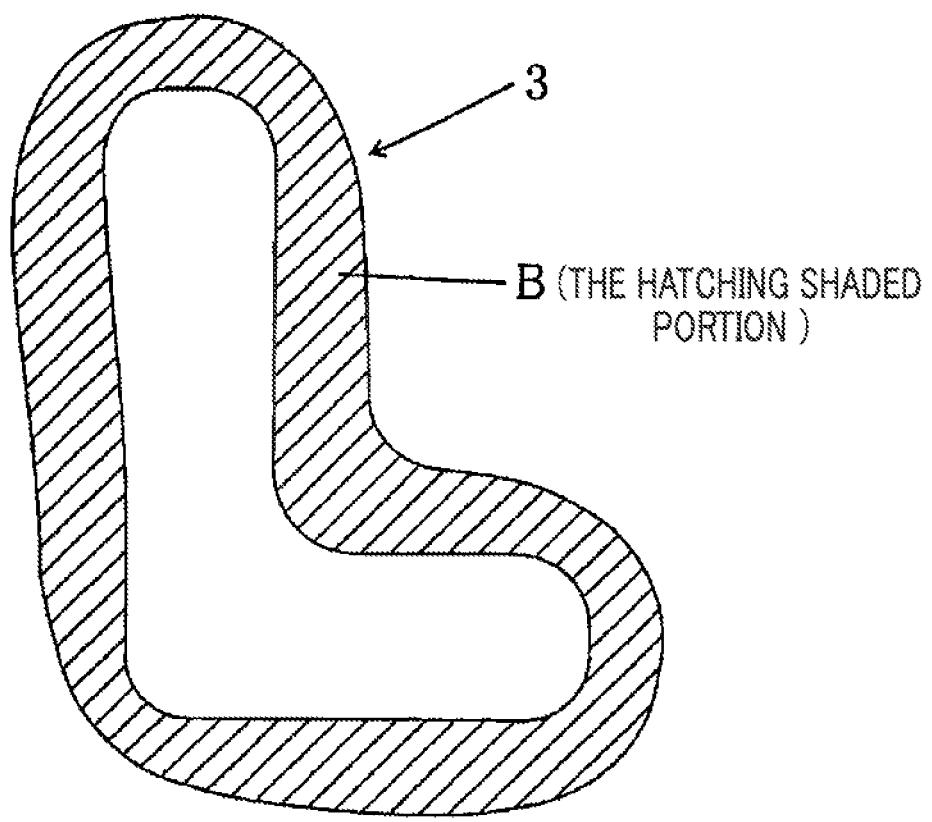
FIG. 24 is a plan view illustrating the shape of a metal stock sheet when drawing, and a crease inhibiting region in the metal stock sheet.
Figure 25A:
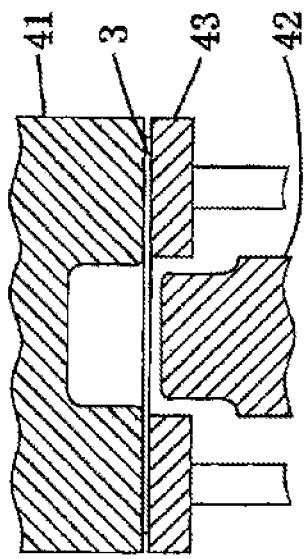
FIGS. 25A to 25D are cross-sections illustrating a mold for drawing and a procedure for drawing.
Figure 25B:
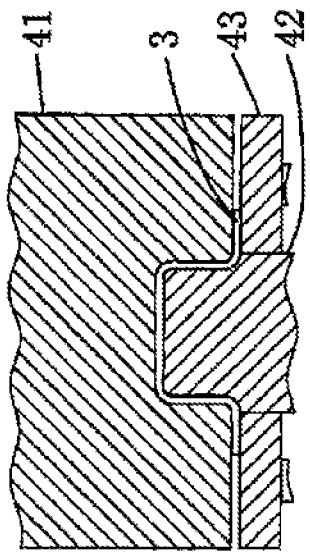
Figure 25C:
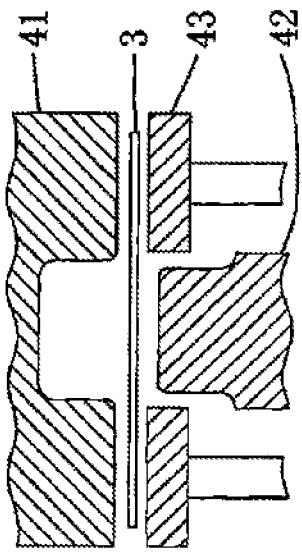
Figure 25D:
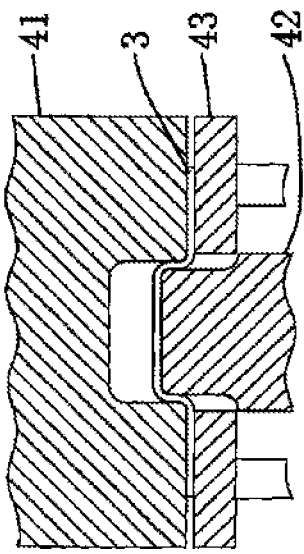
Figure 26:
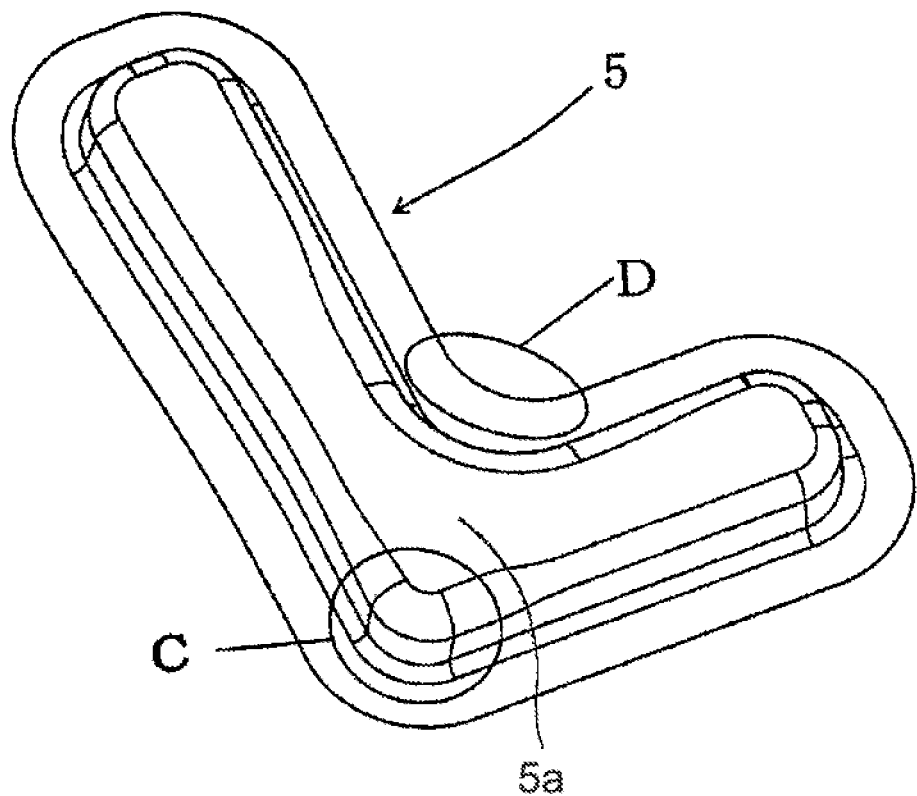
FIG. 26 is a perspective view of a drawn panel formed by drawing.

The press component 1 has a hat shaped cross-section configured from the top plate section 11, the vertical walls 12, 14 joined to both sides of the top plate section 11, and flange portions 13, 15 joined to the respective vertical walls 12, 14, and is shaped in an L shape in plan view, due to curving along the longitudinal direction at the curved portion 1a (the directions of the double-headed arrow in FIG. 21).

The press component 1 is generally employed in frame components for automobiles, and is configured from metal stock sheet formed from high tension sheet steel having a sheet thickness of from 0.8 mm to 3.2 mm and also having a tensile strength of from 590 MPa to 1800 MPa. The tensile strength of the metal stock sheet is preferably from 200 MPa to 1800 MPa in order to secure qualities such as the strength of the frame component for an automobile, and the sheet thickness can be reduced when the tensile strength is 500 MPa or above, and more so when the tensile strength is 590 MPa or above, with reduced sheet thickness being preferable due to enabling component weight reduction. Moreover, 700 MPa or greater is most preferable.

In cases in which such high strength sheet steel is employed, resistance to inflow of metal stock sheet during molding of the vertical wall 14 and the flange portion 15 at the inside periphery of the curved portion 1a becomes large when the width of the top plate section 11 is too wide in plan view, and inflow of metal stock sheet toward the inside periphery of the curved portion 1a becomes insufficient. Therefore, the width of the top plate section 11 is preferably 400 mm or less. However, when the width of the top plate section 11 is set too narrow, sufficient pad pressure cannot be secured due to having to make the pressurizing device for the pad, such as a gas cushion, small. The width of the top plate section 11 is therefore preferably 30 mm or more.

Moreover, when the vertical walls 12, 14 are too high in side view, the resistance to inflow of metal stock sheet during molding of the vertical wall 14 and the flange portion 15 at the inside periphery of the curved portion 1a becomes large, and the inflow of metal stock sheet to the inside periphery of the curved portion 1a becomes insufficient. Therefore, the height of the vertical walls 12, 14 is preferably 300 mm or less.

When the curvature of the inside periphery of the curved portion 1a is too small in plan view, the inflow of metal stock sheet to the inside periphery of the curved portion 1a during molding of the flange portion 15 at the inside periphery of the curved portion 1a becomes insufficient. Therefore, the curvature of the vertical wall 14 at the inside periphery of the curved portion 1a is preferably 5 mm or more in plan view.

Therefore, the width of top plate section 11 is preferably from 30 mm to 400 mm in plan view, the height of the vertical walls 12, 14 is preferably 300 mm or less in side view, and the curvature of the inside periphery of the curved portion 1a is preferably 5 mm or more in plan view.

Moreover, the proportional decrease in the sheet thickness of the press component 1 as calculated by ((maximum value of sheet thickness−minimum value of sheet thickness)/maximum value of sheet thickness)×100 is 15% or less. Hitherto there has been no press component 1 with such a low proportional decrease in sheet thickness. Having such a low proportional decrease in the sheet thickness of the press component 1 that is a structural member of an automobile gives excellent crash safety performance, and enables a vehicle weight reduction to be achieved since configuration is made from high tension sheet steel with a tensile strength of from 590 MPa to 1800 MPa.

2. Manufacturing Method and Manufacturing Device for Press Component

FIG. 1A to FIG. 1E are cross-sections illustrating a mold configuration and molding process according to the present invention.

The mold illustrated in FIG. 1A to FIG. 1E is employed in the present invention to mold the press component 1 by press molding metal stock sheet.

The mold includes a punch 72 and a blank holder 73, and a pad 74, a die 71, and a bender 75 that are positioned facing the punch 72 and the blank holder 73.

The punch 72 has a shape that includes sheet thickness back face side shapes of the top plate section 11 of the press component 1, the vertical wall 14 positioned at the inside periphery of the curved portion 1a, and the flange portion 15.

The blank holder 73 has a shape that includes the sheet thickness back face side shape of the flange portion 13 joined to the vertical wall 12 positioned at the outside periphery of the curved portion 1a.

The pad 74 is shaped so as to face toward the blank holder 73 and has a shape that includes the sheet thickness front face side shape of the top plate section 11.

The die 71 has a shape that includes the respective sheet thickness front face side shapes of the vertical wall 12 and the flange portion 13 that are positioned at the outside periphery of the curved portion 1a.

The bender 75 has a shape that includes the respective sheet thickness front face side shapes of both the vertical wall 14 and the flange portion 15 that are positioned at the outside periphery of the curved portion 1a.

FIG. 2A to FIG. 2E are cross-sections illustrating another mold configuration and another molding process according to the present invention.

The differences from the mold illustrated in FIG. 1 are that a locking mechanism 76, described later, is installed to the punch 72, and that the bender 75 is installed to a sub-base (not illustrated).

The locking mechanism 76 is configured from a pin disposed so as to be retractably inserted into the punch 72. The locking mechanism 76 is completely housed in the punch 72 from molding start to the molding bottom dead center (FIG. 2A to FIG. 2D), and then at the molding bottom dead center, the locking mechanism 76 is protruded to the blank holder 73 side, and fixes the blank holder 73 to the punch 72. When demolding, the locking mechanism 76 prevents the molded press component 1 from being damaged by pad pressure by achieving a state in which the blank holder 73 is fixed to the punch 72 while the bender 75, the pad 74, and the sub-base are being raised in demolding.

A mechanism that fixes (retains) the positional relationship in demolding between the pad 74, and the sub-base (the bender 75) and the die 75 (drawing die) may be employed as the locking mechanism 76. For example, configuration may be such that (a) the pad 74 is fixed to the sub-base, and at the same time the bender 75 (drawing die) is fixed to the pad 74 or the sub-base when demolding, (b) the separation between the blank holder 73 and the pad 74 is fixed when demolding by inserting a spacer, or (c) the positional relationship between the pad 74 and the bender 75 is fixed (retained) when demolding. The sub-base is described later.

Metal stock sheet is molded into the press component 1 using such a mold.

Figures 3A, 3B:
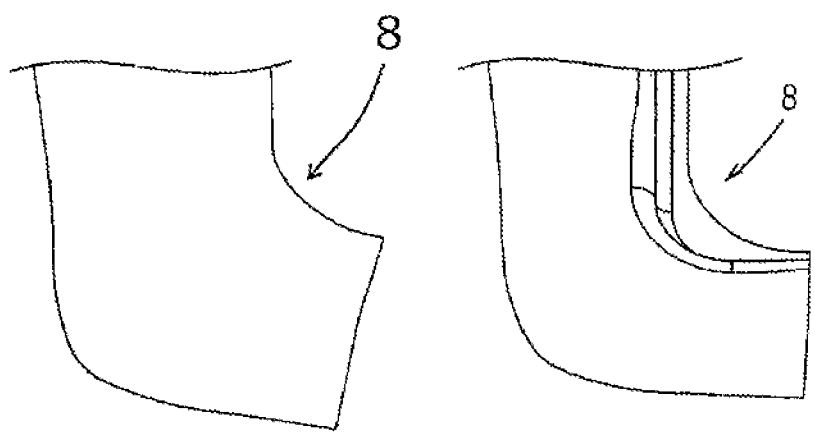
FIG. 3A is a plan view illustrating the shape of a metal stock sheet before molding.
FIG. 3B is a plan view illustrating the shape of the metal stock sheet after a molding procedure.

FIG. 3A is a plan view illustrating a state prior to molding a metal stock sheet 8. FIG. 3B is a plan view illustrating the shape of the metal stock sheet 8 during a molding procedure. FIG. 4 is a plan view illustrating flow of material in the present invention.

First, as illustrated in FIG. 1A, the metal stock sheet 8 having the shape illustrated in FIG. 3A is placed between the punch 72 and blank holder 73, and the pad 74, die 71, and bender 75.

Next, as illustrated in FIG. 1B, the portion of the metal stock sheet 8 for forming the top plate section 11 is pressed against the punch 72 by the pad 74 under pressure, and, while clamped in this manner, a portion of the metal stock sheet 8 further to the outside of the curved portion 1a than the portion for forming the top plate section 11 is pressed against the die 71 by the blank holder 73 under pressure, and clamped.

Next, as illustrated in FIG. 1C, the metal stock sheet 8 is molded into the shape illustrated in FIG. 3B by relatively moving the bender 75 in the direction toward where the punch 72 is placed, working the metal stock sheet 8, and molding the vertical wall 14 and the flange portion 15 at the inside periphery of the curved portion 1a.

When doing so, a portion of the metal stock sheet 8 clamped between the punch 72 and the blank holder 73, and the pad 74 and the die 71, also inflows to the inside periphery of the curved portion 1a and is molded due to the metal stock sheet 8 only being pulled from the inside of the curved portion 1a.

Figure 27:
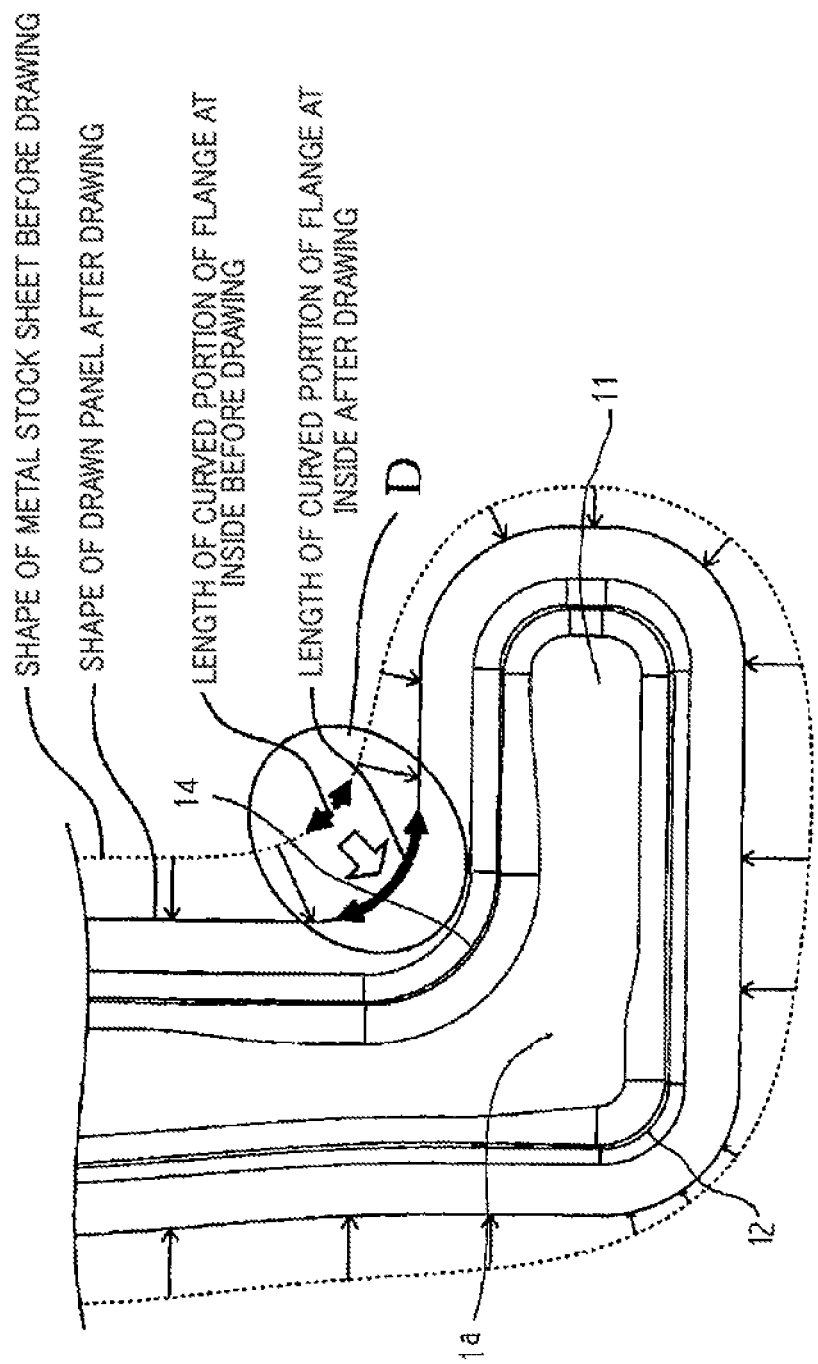
FIG. 27 is a plan view explaining flow of material during drawing.

Thus, unlike cases in which pulled during drawing is from both the outside and the inside of the curved portion 1a (see FIG. 27), as illustrated in FIG. 4, at the flange portion (the portion D) at the inside periphery of the curved portion 1a, the metal stock sheet 8 does not move to a great extent in the molding procedure from the inside to the outside of the curvature of the curved portion 1a, and the metal stock sheet 8 is bent overall by a longitudinal leading end of the metal stock sheet 8 inflowing to the inside periphery of the curved portion 1a. The flange portion 15 that forms the inside of the bend (the portion D) at the inside of the curved portion 1a tends to be compressed. The amount of stretching of the flange portion 15 at the inside periphery of the curved portion 1a (the portion D) during molding is therefore greatly reduced compared to during drawing.

Then, as illustrated in FIG. 1D, after molding of the vertical wall 14 and the flange portion 15 at the inside of the curved portion 1a has finished, the metal stock sheet 8 is pressed against the die 71 by the blank holder 73 under pressure, the die 71 and the blank holder 73 are moved relatively with respect to the metal stock sheet 8 in the direction toward where the blank holder 73 is positioned while maintaining the clamped state, the metal stock sheet 8 is worked, and the vertical walls 12 and the flange portions 13 at the outside periphery of the curved portion 1a are molded. The press component 1 illustrated in FIG. 3 is thereby molded.

When doing so, in the procedure for molding the vertical wall 14 and the flange portion 15 at the inside periphery of the curved portion 1a, the portion for forming the top plate section 11 and the flange portion 15 both inflow to the inside periphery of the curved portion 1a, giving compression in the longitudinal direction and resulting in a state in which there is residual compression stress. The corner where the vertical wall 12 and the top plate section 11 meet at the outside periphery of the curved portion 1a that is greatly stretched in the molding procedure (a portion C in FIG. 4) is thus also molded into a shape by being pulled out from the state in which there is residual compression stress. The extensibility required of the material is therefore small compared to cases in which drawing is performed by molding from a state without compression stress. Cracks are accordingly suppressed from developing and favorable molding is enabled as a result, even when a high strength material having low extensibility (for example, high tension steel of 590 MPa grade or above) is employed as the metal stock sheet 8.

Bending is performed using the bender 75 during molding of the vertical wall 14 and the flange portion 15 at the inside periphery of the curved portion 1a, and molding with metal stock sheet 8 is accordingly possible and it is possible to achieve a high material yield, due to not requiring the crease inhibiting region that was necessary during drawing for the portion at the inside periphery of the curved portion 1a and for a longitudinal direction leading end portion.

Finally, as illustrated in FIG. 1E, after molding of the press component 1 has been completed, in order to take the molded press component 1 out from the mold after molding, the blank holder 73 is fixed so as not to move relatively with respect to the punch 72 by using, for example, the locking mechanism 76, the blank holder 73 is rendered so as not to press the molded press component 1 against the die 71, and the pad 74, and the die 71 and the bender 75 are moved relatively away from the blank holder 73 and the punch 72. The press component 1 is thereby able to be taken out without being deformed or damaged by being pressed by the pad 74 or the blank holder 73.

The manufacturing device for the press component has been outlined above, and detailed explanation regarding the configuration of the mold follows.

FIG. 5A to FIG. 5D are explanatory diagrams illustrating an example of a mold employed by the present invention. The locking mechanism 76 is omitted from FIG. 5 to FIG. 7.

In the mold, the bender 75, the die (drawing die) 71, and the pad 74 are each directly supported by a die base 77, and are each driven independently with respect to the die base 77. The mold can be made more compact overall since a frame or the like is not employed to support the bender 75 or the blank holder 73.

FIG. 6A to FIG. 6D are explanatory diagrams illustrating another example of a mold employed in the present invention.

The mold has a structure in which sub-bases 75 embrace the pad 74 and the die (drawing die) 71, and eccentric load from the pad 74 and the die (drawing die) 71 is borne by the sub-base 75 that is integrated together with a bender. An improvement is thereby achieved in mold shaping over the example mold illustrated in FIG. 5.

Figure 8:
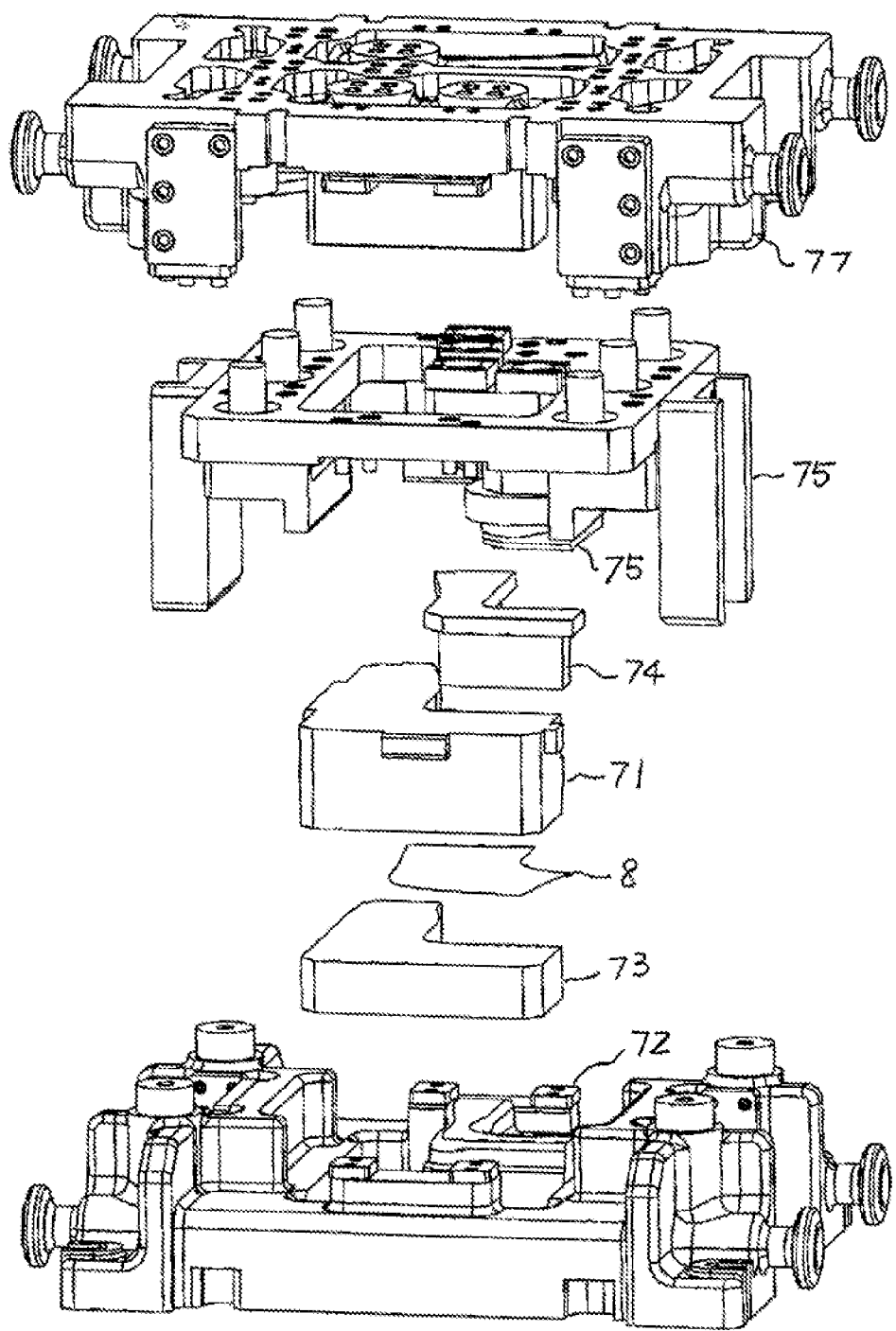
FIG. 8 is an exploded perspective view of the mold illustrated in FIG. 7.

FIG. 7A to FIG. 7D are explanatory diagrams illustrating another example of a mold employed in the present invention. FIG. 8 is an exploded perspective view of the mold.

Such a mold enables the burden of load of the pad 74 being exerted on the bender 75 to be avoided by incorporating the pad 74 into the die base 77 rather than the bender 75. An improvement is thereby achieved in sub-base mold deformation over the example mold illustrated in FIG. 6 since orthogonal direction load imparted to the sub-base is entirely received from the bender.

The examples of molds illustrated in FIG. 5A to FIG. 5D, FIG. 6A to FIG. 6D, and FIG. 7A to FIG. 7D are all molds having structures that are particularly effective for implementing the manufacturing method according to the present invention. However, since the structure that suppresses mold deformation affects the mold cost and size, which structure of mold to be employed may be appropriately decided in consideration of the size and shape of the component to be manufactured, and the rigidity required by the mold in view of the strength of the steel stock sheet to be employed.

EXAMPLES

Figure 9A:
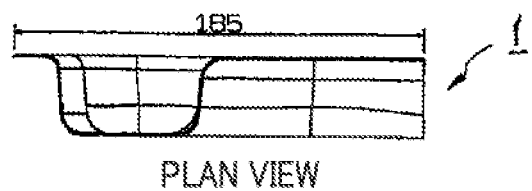
FIGS. 9A to 9C illustrate a press component 1 molded in Comparative Examples 1 to 3 and in Examples 1 to 3, and are a front face view, a plan view, and a right side view, respectively.
Figure 9B:
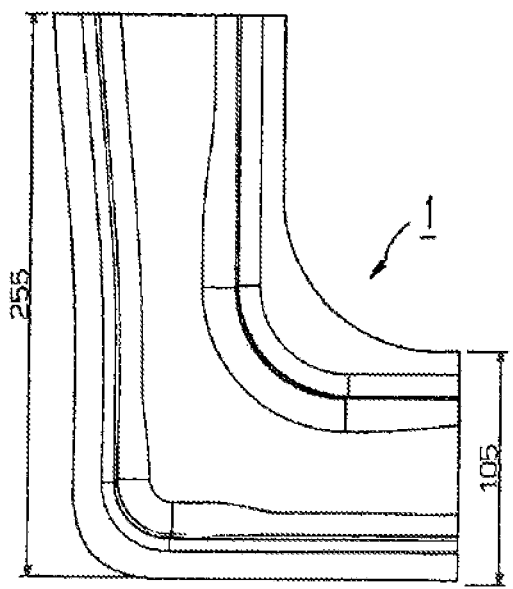
Figure 9C:
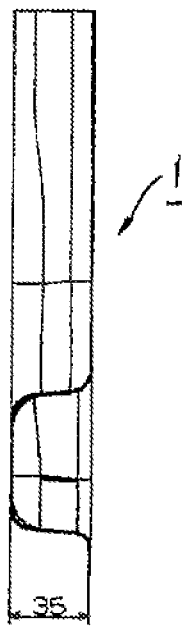
Figure 10:
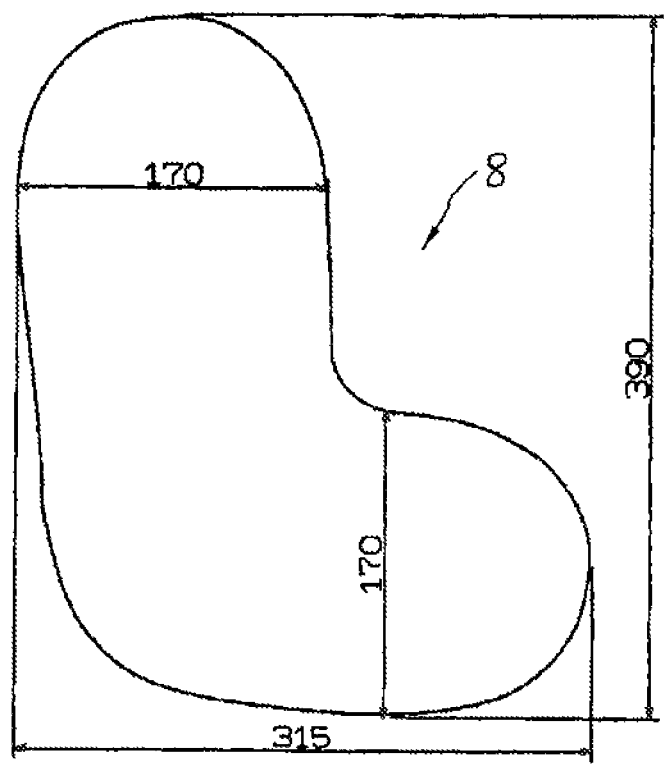
FIG. 10 is a plan view illustrating the shape of a metal stock sheet employed in Comparative Examples 1 to 3.
Figure 11:
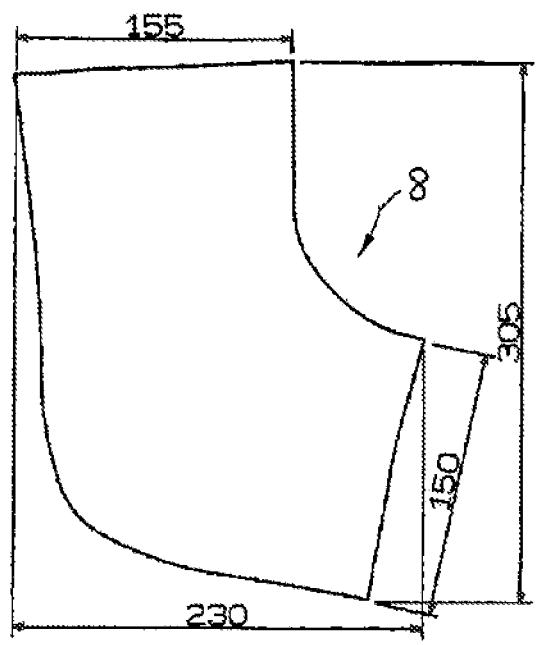
FIG. 11 is a plan view illustrating the shape of a metal stock sheet employed in Examples 1 to 3.
Figure 12:
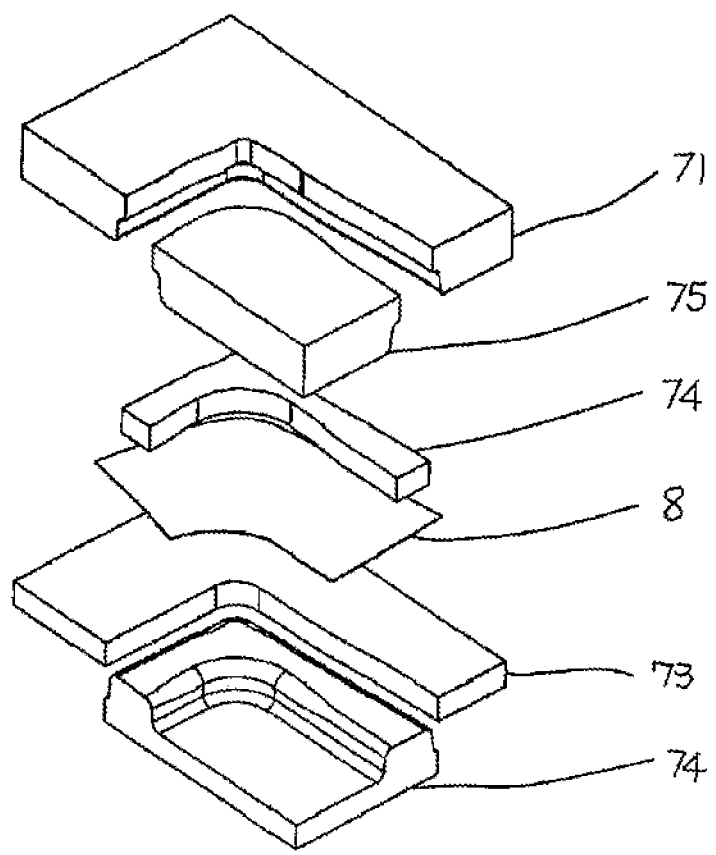
FIG. 12 is a perspective view illustrating a configuration of the mold employed in Examples 1 to 3.

FIG. 9A to FIG. 9C illustrate the press component 1 to be molded in Comparative Examples 1 to 3 and in Examples 1 to 3, and are a front face view, a plan view, and a right side view, respectively. FIG. 10 is a plan view illustrating the shape of the metal stock sheet 8 employed in Comparative Examples 1 to 3. FIG. 11 is a plan view illustrating the shape of the metal stock sheet 8 employed in Examples 1 to 3. FIG. 12 is a perspective view illustrating the configuration of the mold employed in Examples 1 to 3.

The results for Comparative Examples 1 to 3 and Examples 1 to 6 are listed collectively in Table 1.

In Comparative Examples 1 to 3 and in Examples 1 to 3, the press component 1 having the shape illustrated in FIG. 9A to FIG. 9C is manufactured using sheet steel of sheet thickness 1.2 mm, and breaking strengths of 270 MPa, 590 MPa, and 980 MPa as the metal stock sheet, using as the manufacturing method both a conventional drawing method and the present invention.

Note that the units of the numerical values in FIG. 9 to FIG. 11 are millimeters. Note that the material yields in Table 1 are ratios of the material that goes to form the component to metal stock sheet.

strength sheet steel with low extensibility as the metal stock sheet. Although cracks developed and molding was not achieved in Comparative Examples 2 and 3, favorable molding without cracking was achieved in Examples 2 and 3.

Figure 13A:
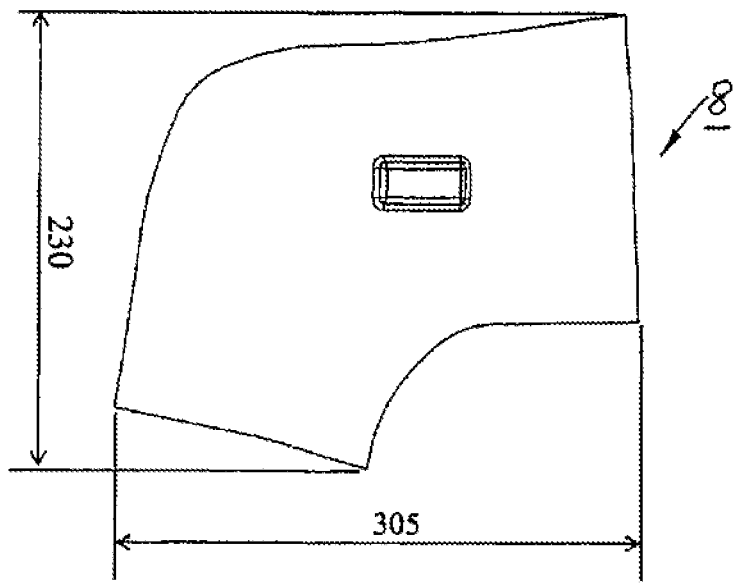
FIG. 13A is a plan view illustrating the shape of metal stock sheet employed in Example 4.
Figure 13B:
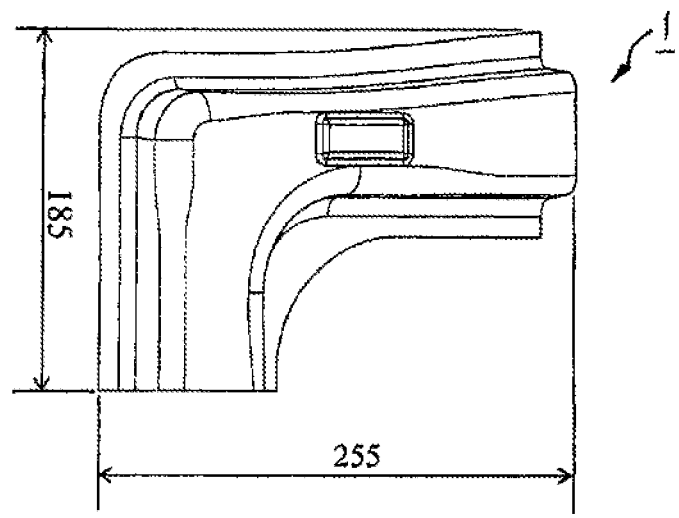
FIG. 13B is a perspective view of a press molded component.

FIG. 13A is a plan view illustrating the shape of the metal stock sheet 8 employed in Example 4. FIG. 13B is a perspective view of the press component 1.

Example 4 is an example in which the press component 1 having the shape illustrated in FIG. 13B was molded employing sheet steel of sheet thickness 1.2 mm having a breaking strength of 590 MPa as the metal stock sheet, worked into the shape illustrated in FIG. 13A. It was confirmed that favorable molding was possible even when such non-planar metal stock sheet is employed.

Figure 14A:
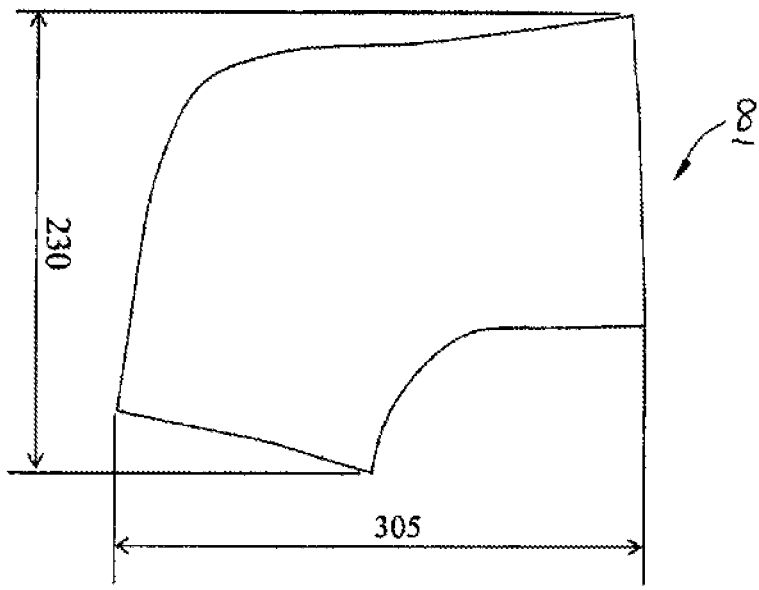
FIG. 14A is a plan view illustrating the shape of a metal stock sheet employed in Example 5.
Figure 14B:
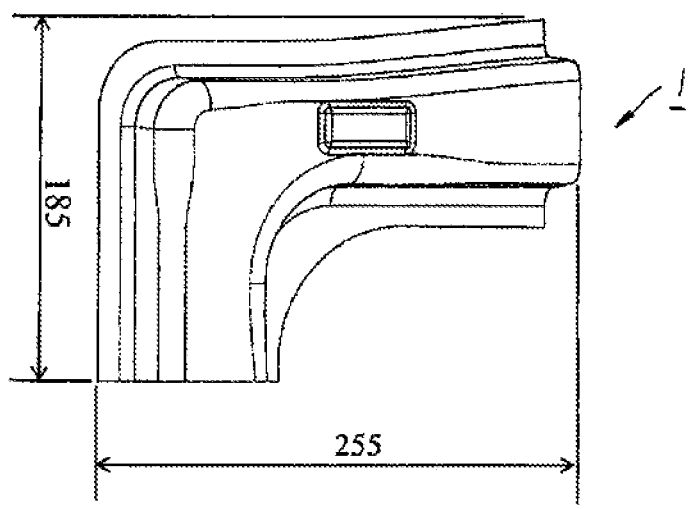
FIG. 14B is a perspective view of a press molded component.

FIG. 14A is a plan view illustrating the shape of the metal stock sheet 8 employed in Example 5. FIG. 14B is a perspective view of the press component 1.

Example 5 is an example in which molding was performed to the shape illustrated in FIG. 14B by employing sheet steel having a sheet thickness of 1.2 mm, a breaking strength of 590 MPa, and a flat plate shape illustrated in FIG. 14A, as the metal stock sheet. Although the top plate section was not flat, favorable molding was achieved by working the top plate section by working using the pad.

Figure 15:
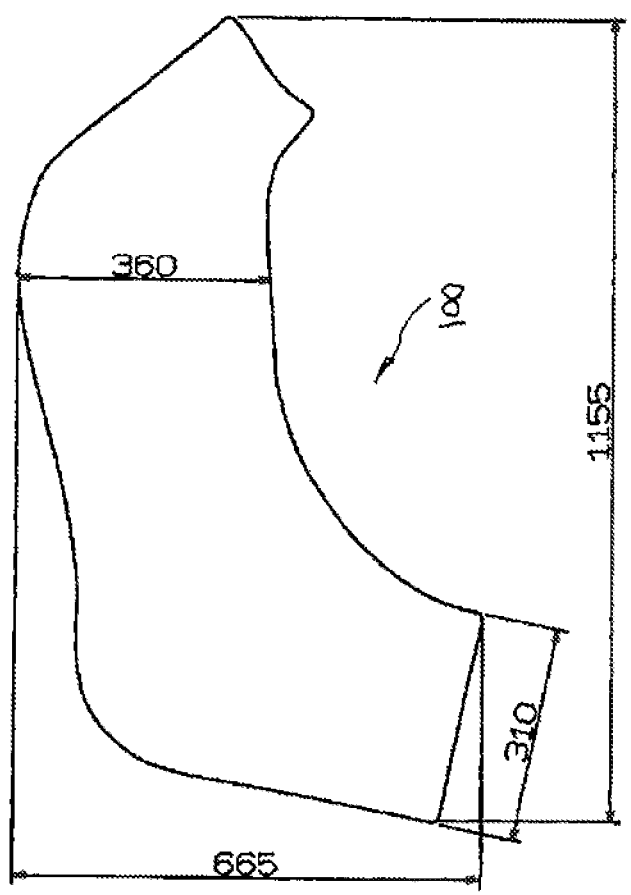
FIG. 15 is a plan view illustrating the shape of metal stock sheet employed in Example 6.
Figure 16A:
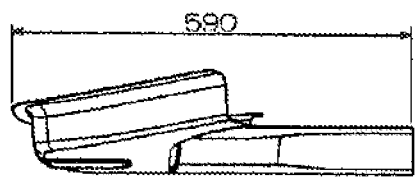
FIGS. 16A to 16C illustrate an intermediate shape molded in Example 6, and are a front face view, a plan view, and a right side view, respectively.
Figure 16B:
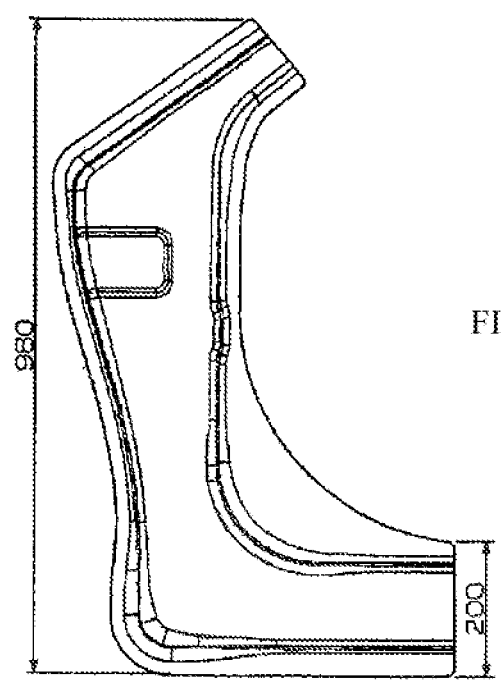
Figure 16C:
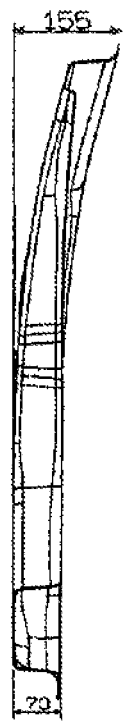
Figure 17A:
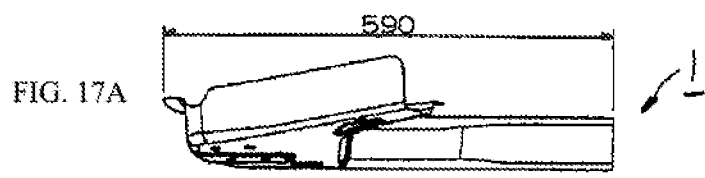
FIGS. 17A to 17C illustrate the shape of a press component molded in Example 6, and are a front face view, a plan view, and right side view, respectively.
Figure 17B:
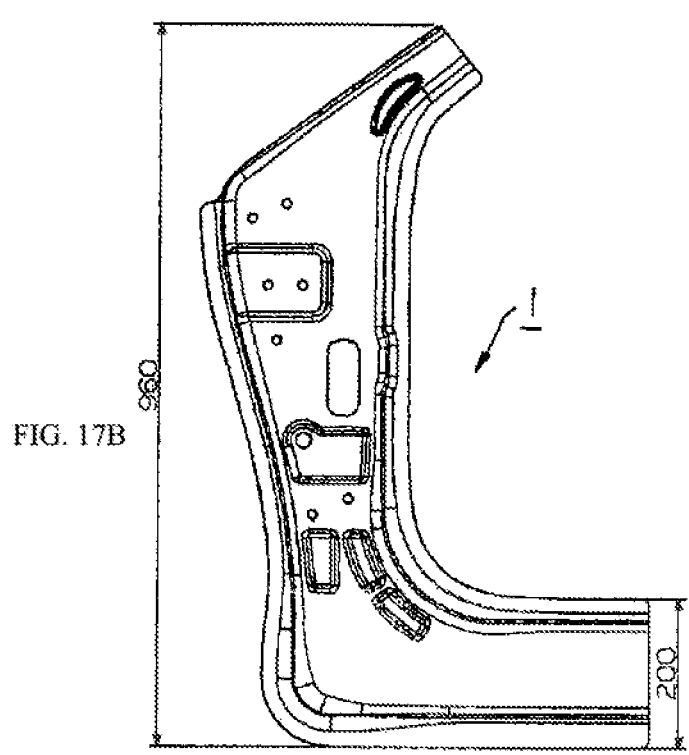
Figure 17C:
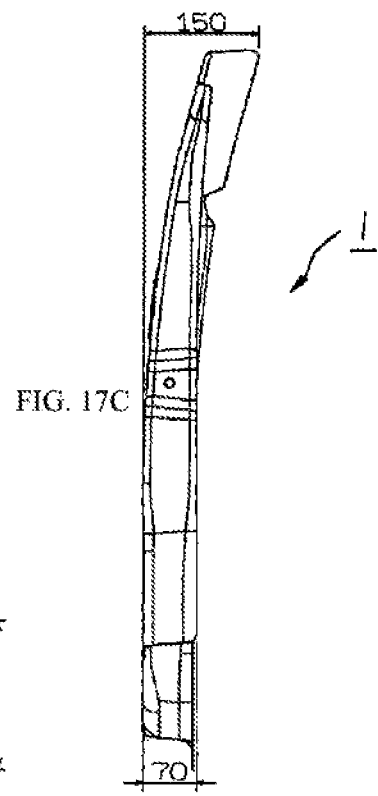
Figure 18:
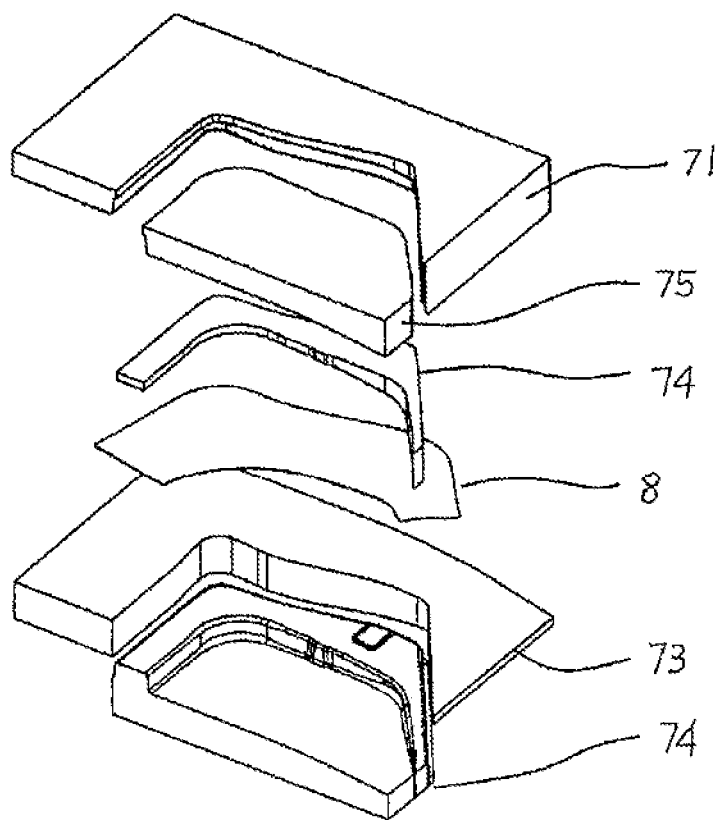
FIG. 18 is a perspective view illustrating a mold configuration for performing molding in Example 6 using the present invention.
Figure 19:
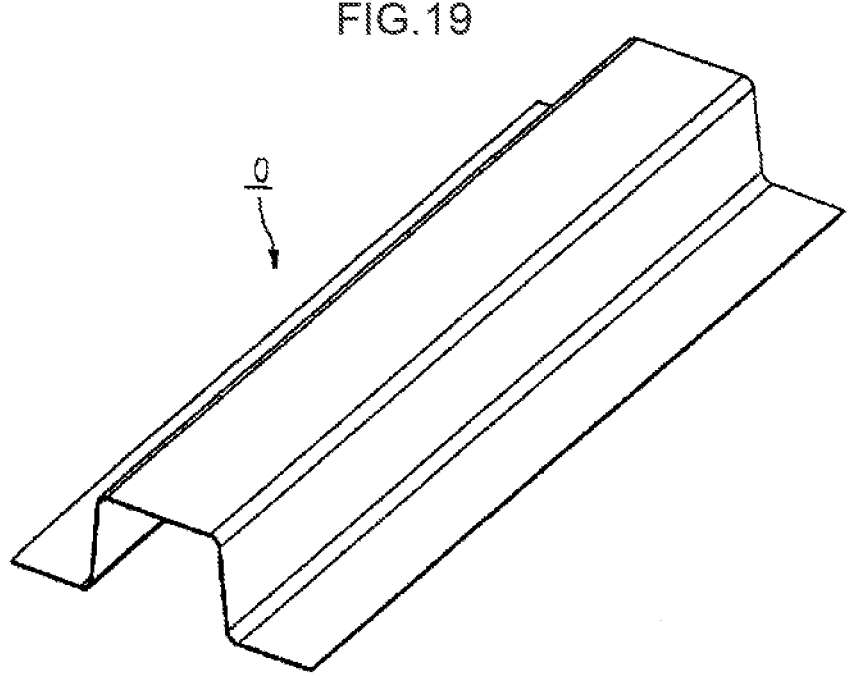
FIG. 19 is a perspective view illustrating an example of a frame member that has a hat shaped cross-section and that has a straight shape along the longitudinal direction in plan view and in side view.
Figure 20A:
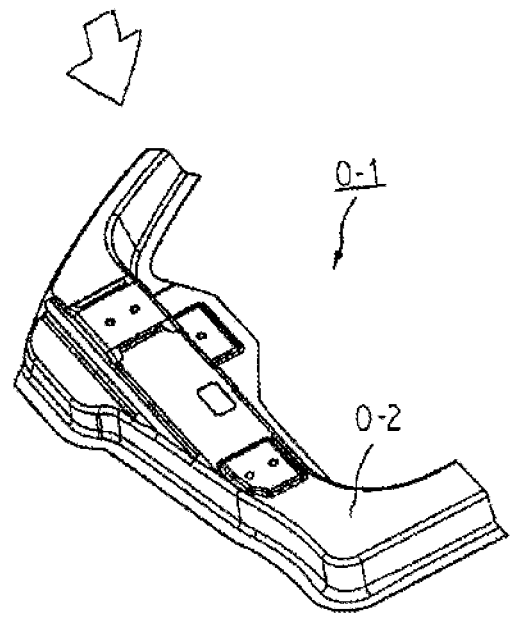
FIG. 20A is a perspective view.
Figure 20B:
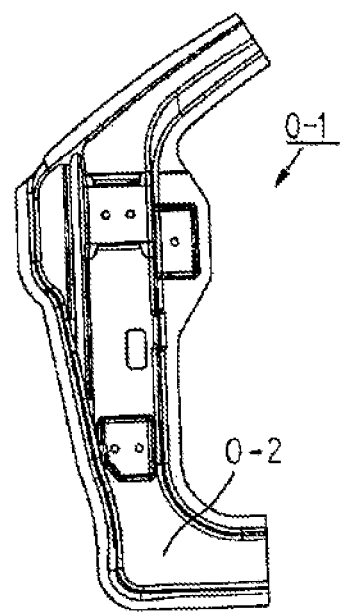
FIG. 20B is a plan view.

FIG. 15 is a plan view illustrating the shape of the metal stock sheet employed in Example 6. FIG. 16A to FIG. 16C illustrate an intermediate shape molded in Example 6, and are a front face view, a plan view, and a right side view, respectively. FIG. 17A to FIG. 17C illustrate the shape of the press component 1 molded in Example 6, and are a front face view, a plan view, and a right side view, respectively. FIG. 18 is a perspective view illustrating a mold configuration for molding using the present invention in Example 6.

Example 6 is an example is in which the complicated shape illustrating in FIG. 17A to FIG. 17C was molded by employing high strength sheet steel having a sheet thickness

TABLE 1

| | Breaking strength of metal stock sheet | Sheet thickness of metal stock sheet | Manufacturing method | Molded state* | Material yield |
|---|---|---|---|---|---|
| Comparative Example 1 | 270 MPa | 1.2 mm | Drawing | Good | 63% |
| Comparative Example 2 | 590 MPa | 1.2 mm | Drawing | Bad | N/A |
| Comparative Example 3 | 980 MPa | 1.2 mm | Drawing | Bad | N/A |
| Example 1 | 270 MPa | 1.2 mm | Present invention | Good | 99% |
| Example 2 | 590 MPa | 1.2 mm | Present invention | Good | 99% |
| Example 3 | 980 MPa | 1.2 mm | Present invention | Good | 99% |
| Example 4 | 590 MPa | 1.2 mm | Present invention | Good | 99% |
| Example 5 | 590 MPa | 1.2 mm | Present invention | Good | 99% |
| Example 6 | 980 MPa | 1.2 mm | Present invention | Good | 92% |

*Good: no cracks were generated; Bad: cracks were generated.

Comparative Example 1 and Example 1 are examples, in which pressing was performed employing low strength sheet steel with excellent extensibility and a breaking strength of 270 MPa. Although molding succeeded without cracking in both cases, it was confirmed that Example 1 was highly advantageous over Comparative Example 1 in terms of material yield.

Comparative Examples 2 and 3, and Examples 2 and 3 are examples in which pressing was performed employing high of 1.2 mm, low extensibility, and tensile strength of 980 MPa, as the metal stock sheet. Metal stock sheet having the shape illustrated in FIG. 15 was employed as the metal stock sheet, and using a mold having the configuration illustrated in FIG. 18, the intermediate shape illustrated in FIG. 16A to FIG. 16C was molded using the present invention, and the press component 1 having the shape illustrated in FIG. 17A to FIG. 17C was then favorably molded without generating cracks or creases being generated by further post-working.

EXPLANATION OF THE REFERENCE
NUMERALS 1 press component
1a curved portion
8 metal stock sheet
11 top plate section
12 vertical wall at outside periphery of curved portion
13 flange portion at outside periphery of curved portion
14 vertical wall at inside periphery of curved portion
15 flange portion at inside periphery of curved portion
2 component
21 top plate section
22 vertical wall at outside of L shaped curve
23 flange joined to vertical wall at outside of L shaped curve
24 vertical wall at inside of L shaped curve
25 flange joined to vertical wall at inside of L shaped curve
3 steel stock sheet
41 die
42 punch
43 blank holder
5 drawn panel
6 drawn panel
71 die
72 punch
73 blank holder
74 pad
75 bender

The invention claimed is:

1. A manufacturing method for a press component in which press working is performed on a metal stock sheet to mold a press component having an L shaped hat shaped cross-section formed from a hat shaped cross-section configured by a top plate section, two vertical walls joined to both sides of the top plate section, and two flanges joined to the two respective vertical walls, and from a curved portion that curves along the longitudinal direction in plan view, or a press component having such an L shaped hat shaped cross-section over a portion thereof, the method comprising molding the press component by:
   placing the metal stock sheet between a punch and a blank holder, and a pad, a die, and a bender;
   pressing and clamping a portion of the metal stock sheet for forming the top plate section against the punch using the pad, and pressing and clamping a portion of the metal stock sheet that will be further to the outside of the curve portion than the portion of the metal stock sheet for forming the top plate section against the die using the blank holder; and
   after molding the vertical wall at the inside periphery of the curved portion and the flange portion joined to that vertical wall through working the metal stock sheet by relatively moving the bender in the direction toward where the punch is positioned,
   molding the vertical wall at the outside periphery of the curved portion and the flange portion joined to that vertical wall, by relatively moving the die and the blank holder in the direction toward where the blank holder is positioned relative to the metal stock sheet and working the metal stock sheet while maintaining the state in which the metal stock sheet is pressed and clamped against the die by the blank holder.

2. The manufacturing method for a press component of claim 1, wherein:
   the punch has a shape including sheet thickness back face side shapes of each of the top plate section, the vertical wall positioned at the inside periphery of the curved portion, and the flange portion joined to that vertical wall;
   the blank holder has a shape including the sheet thickness back face side shape of the flange portion joined to the vertical wall positioned at the outside periphery of the curved portion;
   the pad is shaped so as to face toward the blank holder and has a shape including the sheet thickness front face side shape of the top plate section;
   the die has a shape including the sheet thickness front face side shapes of each of the vertical wall positioned at the outside periphery of the curved portion, and the flange portion joined to that vertical wall; and
   the bender has a shape including the sheet thickness front face side shape of each of the vertical wall positioned at the inside periphery of the curved portion, and the flange portion joined to that vertical wall.

3. The manufacturing method for a press component of claim 1, wherein
   the metal stock sheet is a pre-worked metal sheet.

4. The manufacturing method for a press component of claim 1, wherein,
   after molding the press component, the press component is taken out from the mold by fixing the blank holder so as not to move relative to the punch, and moving the pad, the die, and the bender relatively away from the blank holder and the punch, such that blank holder does not press the molded press component against the die under pressure.

5. The manufacturing method for a press component of claim 1, wherein,
   the metal stock sheet is high tensile sheet steel having a sheet thickness of from 0.8 mm to 3.2 mm, and a tensile strength of from 590 MPa to 1800 MPa.

6. The manufacturing method for a press component of claim 1, wherein:
   the width of the top plate section in plan view is from 30 mm to 400 mm;
   the height of the vertical walls in side view is 300 mm or less; and
   the curvature at the inside periphery of the curved portion in plan view is 5 mm or more.

7. A manufacturing device for a press component, the manufacturing device comprising a punch and a blank holder, and a pad, a die and a bender that are disposed facing the punch and the blank holder, wherein the manufacturing device performs press working on a metal stock sheet to mold a press component having an L shaped hat shaped cross-section formed from a hat shaped cross-section configured by a top plate section, two vertical walls joined to both sides of the top plate section, and two flanges joined to the two respective vertical walls, and from a curved portion that curves along the longitudinal direction in plan view, or a press component having such an L shaped hat shaped cross-section over a portion thereof, the manufacturing device molding the press component by:
   performing first molding that molds the vertical wall at the inside periphery of the curved portion and the flange portion joined to that vertical wall by the pad pressing and clamping a portion of the metal stock sheet for forming the top plate section against the punch, the blank holder pressing and clamping a portion of the metal stock sheet that will be further to the outside of the curve portion than the portion of the metal stock sheet for forming the top plate section against the die, and working the metal stock sheet by relatively moving the bender in the direction toward where the punch is positioned; and performing second molding to mold the vertical wall at the outside periphery of the curved portion and the flange portion joined to that vertical wall by, after the first molding has been performed, relatively moving the die and the blank holder in the direction toward where the blank holder is positioned relative to the metal stock sheet and working the metal stock sheet while maintaining the state in which the metal stock sheet is pressed and clamped against the die by the blank holder.

8. The manufacturing device for a press component of claim 7, further comprising a locking mechanism that fixes the blank holder such that the blank holder cannot move relative to the punch during demolding after molding has been completed.

9. The manufacturing device for a press component of claim 7, further comprising a sub-base that supports the pad and the die so as to be capable of being raised and lowered, and that is configured integrated together with the bender; and a die base that supports the sub-base so as to be insertable and retractable.

10. The manufacturing device for a press component of claim 7, further comprising:

a sub-base that supports the die so as to be capable of being raised and lowered, and that is configured integrated together with the bender; and a die base that supports the pad so as to be capable of being raised and lowered, and that supports the sub-base so as to be insertable and retractable.

* * * * *